(12) United States Patent
Ishii

(10) Patent No.: US 6,546,053 B1
(45) Date of Patent: Apr. 8, 2003

(54) SYSTEM AND METHOD FOR DECODING SIGNAL AND METHOD OF GENERATING LOOKUP TABLE FOR USING IN SIGNAL DECODING PROCESS

(75) Inventor: Daiji Ishii, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/078,251

(22) Filed: May 13, 1998

(30) Foreign Application Priority Data

May 14, 1997 (JP) .............................. 9-122738
Jan. 7, 1998 (JP) .......................... 10-001256

(51) Int. Cl.[7] .............................................. H04B 1/66
(52) U.S. Cl. ............. 375/240.27; 375/240; 375/240.25; 382/250; 382/248; 341/67; 341/65
(58) Field of Search ...................... 375/240.27, 240, 375/240.25; 348/384, 715–722; 382/250, 248; 341/51, 65, 67

(56) References Cited

U.S. PATENT DOCUMENTS

| | | | | |
|---|---|---|---|---|
| 5,021,891 A | * | 6/1991 | Lee .............................. | 358/432 |
| 5,357,282 A | * | 10/1994 | Lee .............................. | 348/403 |
| 5,471,206 A | * | 11/1995 | Allen et al. .................... | 341/51 |
| 5,491,480 A | * | 2/1996 | Jan et al. ....................... | 341/67 |
| 5,606,370 A | * | 2/1997 | Moon ......................... | 348/390 |
| 5,675,424 A | * | 10/1997 | Park .............................. | 348/398 |
| 5,701,126 A | * | 12/1997 | Kim ............................. | 341/67 |
| 5,867,601 A | * | 2/1999 | Phillips ....................... | 382/250 |
| 6,043,765 A | * | 3/2000 | Twardowski .................. | 341/65 |

FOREIGN PATENT DOCUMENTS

| | | |
|---|---|---|
| JP | 63-299520 | 12/1988 |
| JP | 1-312625 | 12/1989 |
| JP | 2-265329 | 10/1990 |
| JP | 4-215321 | 8/1992 |
| JP | 6-104767 | 4/1994 |
| JP | 7-212242 | 8/1995 |

OTHER PUBLICATIONS

E.L. Schwartz, et al., "Superscaler Huffman Decoder Hardware Design", SPIE, vol. 2186, Image and Video Compression, 1994, pp. 38–47.

* cited by examiner

Primary Examiner—Chris Kelley
Assistant Examiner—Shawn S. An
(74) Attorney, Agent, or Firm—Dickstein, Shapiro, Morin & Oshinsky, LLP

(57) ABSTRACT

A signal decoding system performs variable length decoding and inverse quantization at high speed. From bit stream temporarily held in a bit string buffer, a bit string is parsed as a table address to look up a lookup table in a table looking-up unit and a table selecting unit. By looking up the table, variable length decoding is performed simultaneously for maximum two codewords. Furthermore, the decoded data is inversely quantized in parallel by using inverse quantizars. The results of inverse quantization are stored at appropriate positions in the block by the block storage unit.

9 Claims, 35 Drawing Sheets

FIG. 6

| DECODED DATA (RUN, LEVEL) | CODEWORD LENGTH | CODEWORD |
|---|---|---|
| EOB | 2 | 10 |
| {0,1} | 3 | 110 |
| {0,-1} | 3 | 111 |
| {1,1} | 4 | 0110 |
| {1,-1} | 4 | 0111 |
| {0,2} | 5 | 01000 |
| {0,-2} | 5 | 01001 |
| {2,1} | 5 | 01010 |
| {2,-1} | 5 | 01011 |
| {0,3} | 6 | 001010 |
| {0,-3} | 6 | 001011 |
| {3,1} | 6 | 001110 |
| {3,-1} | 6 | 001111 |
| {4,1} | 6 | 001100 |
| {4,-1} | 6 | 001101 |
| Escape | 6 | 000001 |
| {1,2} | 7 | 0001100 |
| {1,-2} | 7 | 0001101 |
| {5,1} | 7 | 0001110 |
| {5,-1} | 7 | 0001111 |
| {6,1} | 7 | 0001010 |
| {6,-1} | 7 | 0001011 |
| {7,1} | 7 | 0001000 |
| {7,-1} | 7 | 0001001 |
| {0,4} | 8 | 00001100 |
| {0,-4} | 8 | 00001101 |
| {2,2} | 8 | 00001000 |
| {2,-2} | 8 | 00001001 |
| {8,1} | 8 | 00001110 |
| {8,-1} | 8 | 00001111 |
| {9,1} | 8 | 00001010 |
| {9,-1} | 8 | 00001011 |
| {0,5} | 9 | 001001100 |
| {0,-5} | 9 | 001001101 |
| {0,6} | 9 | 001000010 |
| {0,-6} | 9 | 001000011 |
| {1,3} | 9 | 001001010 |
| {1,-3} | 9 | 001001011 |
| {3,2} | 9 | 001001000 |
| {3,-2} | 9 | 001001001 |
| {10,1} | 9 | 001001110 |
| {10,-1} | 9 | 001001111 |
| {11,1} | 9 | 001000110 |
| {11,-1} | 9 | 001000111 |
| {12,1} | 9 | 001000100 |
| {12,-1} | 9 | 001000101 |
| {13,1} | 9 | 001000000 |
| {13,-1} | 9 | 001000001 |

FIG. 7

| DECODED DATA (RUN, LEVEL) | CODEWORD LENGTH | CODEWORD |
|---|---|---|
| {0,7} | 11 | 00000010100 |
| {0,-7} | 11 | 00000010101 |
| {1,4} | 11 | 00000011000 |
| {1,-4} | 11 | 00000011001 |
| {2,3} | 11 | 00000010110 |
| {2,-3} | 11 | 00000010111 |
| {4,2} | 11 | 00000011110 |
| {4,-2} | 11 | 00000011111 |
| {5,2} | 11 | 00000010010 |
| {5,-2} | 11 | 00000010011 |
| {14,1} | 11 | 00000011100 |
| {14,-1} | 11 | 00000011101 |
| {15,1} | 11 | 00000011010 |
| {15,-1} | 11 | 00000011011 |
| {16,1} | 11 | 00000010000 |
| {16,-1} | 11 | 00000010001 |
| {0,8} | 13 | 0000000111010 |
| {0,-8} | 13 | 0000000111011 |
| {0,9} | 13 | 0000000110000 |
| {0,-9} | 13 | 0000000110001 |
| {0,10} | 13 | 0000000100110 |
| {0,-10} | 13 | 0000000100111 |
| {0,11} | 13 | 0000000100000 |
| {0,-11} | 13 | 0000000100001 |
| {1,5} | 13 | 0000000110110 |
| {1,-5} | 13 | 0000000110111 |
| {2,4} | 13 | 0000000101000 |
| {2,-4} | 13 | 0000000101001 |
| {3,3} | 13 | 0000000111000 |
| {3,-3} | 13 | 0000000111001 |
| {4,3} | 13 | 0000000100100 |
| {4,-3} | 13 | 0000000100101 |
| {6,2} | 13 | 0000000111100 |
| {6,-2} | 13 | 0000000111101 |
| {7,2} | 13 | 0000000101010 |
| {7,-2} | 13 | 0000000101011 |
| {8,2} | 13 | 0000000100010 |
| {8,-2} | 13 | 0000000100011 |
| {17,1} | 13 | 0000000111110 |
| {17,-1} | 13 | 0000000111111 |
| {18,1} | 13 | 0000000110100 |
| {18,-1} | 13 | 0000000110101 |
| {19,1} | 13 | 0000000110010 |
| {19,-1} | 13 | 0000000110011 |
| {20,1} | 13 | 0000000101110 |
| {20,-1} | 13 | 0000000101111 |
| {21,1} | 13 | 0000000101100 |
| {21,-1} | 13 | 0000000101101 |

FIG. 8

| DECODED DATA (RUN, LEVEL) | CODEWORD LENGTH | CODEWORD |
|---|---|---|
| {0,12} | 14 | 00000000110100 |
| {0,-12} | 14 | 00000000110101 |
| {0,13} | 14 | 00000000110010 |
| {0,-13} | 14 | 00000000110011 |
| {0,14} | 14 | 00000000110000 |
| {0,-14} | 14 | 00000000110001 |
| {0,15} | 14 | 00000000101110 |
| {0,-15} | 14 | 00000000101111 |
| {1,6} | 14 | 00000000101100 |
| {1,-6} | 14 | 00000000101101 |
| {1,7} | 14 | 00000000101010 |
| {1,-7} | 14 | 00000000101011 |
| {2,5} | 14 | 00000000101000 |
| {2,-5} | 14 | 00000000101001 |
| {3,4} | 14 | 00000000100110 |
| {3,-4} | 14 | 00000000100111 |
| {5,3} | 14 | 00000000100100 |
| {5,-3} | 14 | 00000000100101 |
| {9,2} | 14 | 00000000100010 |
| {9,-2} | 14 | 00000000100011 |
| {10,2} | 14 | 00000000100000 |
| {10,-2} | 14 | 00000000100001 |
| {22,1} | 14 | 00000000111110 |
| {22,-1} | 14 | 00000000111111 |
| {23,1} | 14 | 00000000111100 |
| {23,-1} | 14 | 00000000111101 |
| {24,1} | 14 | 00000000111010 |
| {24,-1} | 14 | 00000000111011 |
| {25,1} | 14 | 00000000111000 |
| {25,-1} | 14 | 00000000111001 |
| {26,1} | 14 | 00000000110110 |
| {26,-1} | 14 | 00000000110111 |

FIG. 9

| DECODED DATA (RUN, LEVEL) | CODEWORD LENGTH | CODEWORD |
|---|---|---|
| {0,16} | 15 | 000000000111110 |
| {0,-16} | 15 | 000000000111111 |
| {0,17} | 15 | 000000000111100 |
| {0,-17} | 15 | 000000000111101 |
| {0,18} | 15 | 000000000111010 |
| {0,-18} | 15 | 000000000111011 |
| {0,19} | 15 | 000000000111000 |
| {0,-19} | 15 | 000000000111001 |
| {0,20} | 15 | 000000000110110 |
| {0,-20} | 15 | 000000000110111 |
| {0,21} | 15 | 000000000110100 |
| {0,-21} | 15 | 000000000110101 |
| {0,22} | 15 | 000000000110010 |
| {0,-22} | 15 | 000000000110011 |
| {0,23} | 15 | 000000000110000 |
| {0,-23} | 15 | 000000000110001 |
| {0,24} | 15 | 000000000101110 |
| {0,-24} | 15 | 000000000101111 |
| {0,25} | 15 | 000000000101100 |
| {0,-25} | 15 | 000000000101101 |
| {0,26} | 15 | 000000000101010 |
| {0,-26} | 15 | 000000000101011 |
| {0,27} | 15 | 000000000101000 |
| {0,-27} | 15 | 000000000101001 |
| {0,28} | 15 | 000000000100110 |
| {0,-28} | 15 | 000000000100111 |
| {0,29} | 15 | 000000000100100 |
| {0,-29} | 15 | 000000000100101 |
| {0,30} | 15 | 000000000100010 |
| {0,-30} | 15 | 000000000100011 |
| {0,31} | 15 | 000000000100000 |
| {0,-31} | 15 | 000000000100001 |

FIG.10

| DECODED DATA {RUN, LEVEL} | CODEWORD LENGTH | CODEWORD |
|---|---|---|
| {0,32} | 16 | 0000000000110000 |
| {0,-32} | 16 | 0000000000110001 |
| {0,33} | 16 | 0000000000101110 |
| {0,-33} | 16 | 0000000000101111 |
| {0,34} | 16 | 0000000000101100 |
| {0,-34} | 16 | 0000000000101101 |
| {0,35} | 16 | 0000000000101010 |
| {0,-35} | 16 | 0000000000101011 |
| {0,36} | 16 | 0000000000101000 |
| {0,-36} | 16 | 0000000000101001 |
| {0,37} | 16 | 0000000000100110 |
| {0,-37} | 16 | 0000000000100111 |
| {0,38} | 16 | 0000000000100100 |
| {0,-38} | 16 | 0000000000100101 |
| {0,39} | 16 | 0000000000100010 |
| {0,-39} | 16 | 0000000000100011 |
| {0,40} | 16 | 0000000000100000 |
| {0,-40} | 16 | 0000000000100001 |
| {1,8} | 16 | 0000000000111110 |
| {1,-8} | 16 | 0000000000111111 |
| {1,9} | 16 | 0000000000111100 |
| {1,-9} | 16 | 0000000000111101 |
| {1,10} | 16 | 0000000000111010 |
| {1,-10} | 16 | 0000000000111011 |
| {1,11} | 16 | 0000000000111000 |
| {1,-11} | 16 | 0000000000111001 |
| {1,12} | 16 | 0000000000110110 |
| {1,-12} | 16 | 0000000000110111 |
| {1,13} | 16 | 0000000000110100 |
| {1,-13} | 16 | 0000000000110101 |
| {1,14} | 16 | 0000000000110010 |
| {1,-14} | 16 | 0000000000110011 |

FIG.11

| DECODED DATA {RUN, LEVEL} | CODEWORD LENGTH | CODEWORD |
|---|---|---|
| {1,15} | 17 | 00000000000100110 |
| {1,-15} | 17 | 00000000000100111 |
| {1,16} | 17 | 00000000000100100 |
| {1,-16} | 17 | 00000000000100101 |
| {1,17} | 17 | 00000000000100010 |
| {1,-17} | 17 | 00000000000100011 |
| {1,18} | 17 | 00000000000100000 |
| {1,-18} | 17 | 00000000000100001 |
| {6,3} | 17 | 00000000000101000 |
| {6,-3} | 17 | 00000000000101001 |
| {11,2} | 17 | 00000000000110100 |
| {11,-2} | 17 | 00000000000110101 |
| {12,2} | 17 | 00000000000110010 |
| {12,-2} | 17 | 00000000000110011 |
| {13,2} | 17 | 00000000000110000 |
| {13,-2} | 17 | 00000000000110001 |
| {14,2} | 17 | 00000000000101110 |
| {14,-2} | 17 | 00000000000101111 |
| {15,2} | 17 | 00000000000101100 |
| {15,-2} | 17 | 00000000000101101 |
| {16,2} | 17 | 00000000000101010 |
| {16,-2} | 17 | 00000000000101011 |
| {27,1} | 17 | 00000000000111110 |
| {27,-1} | 17 | 00000000000111111 |
| {28,1} | 17 | 00000000000111100 |
| {28,-1} | 17 | 00000000000111101 |
| {29,1} | 17 | 00000000000111010 |
| {29,-1} | 17 | 00000000000111011 |
| {30,1} | 17 | 00000000000111000 |
| {30,-1} | 17 | 00000000000111001 |
| {31,1} | 17 | 00000000000110110 |
| {31,-1} | 17 | 00000000000110111 |

FIG.12

| DECODED DATA {RUN, LEVEL} | CODEWORD LENGTH | CODEWORD | BIT POSITION MATCHING CODE WORD | MINIMUM VALUE TABLE ADDRESS | MAXIMUM VALUE |
|---|---|---|---|---|---|
| {0,1}, EOB | 5 | 11010 | 11010?? | 104 | 107 |
| {0,-1}, EOB | 5 | 11110 | 11110?? | 120 | 123 |
| {1,1}, EOB | 6 | 011010 | 011010? | 52 | 53 |
| {1,-1}, EOB | 6 | 011110 | 011110? | 60 | 61 |
| {0,1}, {0,1} | 6 | 110110 | 110110? | 108 | 109 |
| {0,1}, {0,-1} | 6 | 110111 | 110111? | 110 | 111 |
| {0,-1}, {0,1} | 6 | 111110 | 111110? | 124 | 125 |
| {0,-1}, {0,-1} | 6 | 111111 | 111111? | 126 | 127 |
| {0,2}, EOB | 7 | 0100010 | 0100010 | 34 | 34 |
| {0,-2}, EOB | 7 | 0100110 | 0100110 | 38 | 38 |
| {2,1}, EOB | 7 | 0101010 | 0101010 | 42 | 42 |
| {2,-1}, EOB | 7 | 0101110 | 0101110 | 46 | 46 |
| {0,1}, {1,1} | 7 | 1100110 | 1100110 | 102 | 102 |
| {0,1}, {1,-1} | 7 | 1100111 | 1100111 | 103 | 103 |
| {0,-1}, {1,1} | 7 | 1110110 | 1110110 | 118 | 118 |
| {0,-1}, {1,-1} | 7 | 1110111 | 1110111 | 119 | 119 |
| {1,1}, {0,1} | 7 | 0110110 | 0110110 | 54 | 54 |
| {1,1}, {0,-1} | 7 | 0110111 | 0110111 | 55 | 55 |
| {1,-1}, {0,1} | 7 | 0111110 | 0111110 | 62 | 62 |
| {1,-1}, {0,-1} | 7 | 0111111 | 0111111 | 63 | 63 |
| EOB | 2 | 10 | 10????? | 64 | 95 |
| {0,1} | 3 | 110 | 110???? | 96 | 111 |
| {0,-1} | 3 | 111 | 111???? | 112 | 127 |
| {1,1} | 4 | 0110 | 0110??? | 48 | 55 |
| {1,-1} | 4 | 0111 | 0111??? | 56 | 63 |
| {0,2} | 5 | 01000 | 01000?? | 32 | 35 |
| {0,-2} | 5 | 01001 | 01001?? | 36 | 39 |
| {2,1} | 5 | 01010 | 01010?? | 40 | 43 |
| {2,-1} | 5 | 01011 | 01011?? | 44 | 47 |

FIG.13

| DECODED DATA {RUN, LEVEL} | CODEWORD LENGTH | CODEWORD | BIT POSITION MATCHING CODE WORD | TABLE ADDRESS MINIMUM VALUE | MAXIMUM VALUE |
|---|---|---|---|---|---|
| {0, 3} | 6 | 001010 | 001010???????????? | 20480 | 22527 |
| {0, -3} | 6 | 001011 | 001011???????????? | 22528 | 24575 |
| {3, 1} | 6 | 001110 | 001110???????????? | 28672 | 30719 |
| {3, -1} | 6 | 001111 | 001111???????????? | 30720 | 32767 |
| {4, 1} | 6 | 001100 | 001100???????????? | 24576 | 26623 |
| {4, -1} | 6 | 001101 | 001101???????????? | 26624 | 28671 |
| Escape | 6 | 000001 | 000001???????????? | 2048 | 4095 |
| {1, 2} | 7 | 0001100 | 0001100??????????? | 12288 | 13311 |
| {1, -2} | 7 | 0001101 | 0001101??????????? | 13312 | 14335 |
| {5, 1} | 7 | 0001110 | 0001110??????????? | 14336 | 15359 |
| {5, -1} | 7 | 0001111 | 0001111??????????? | 15360 | 16383 |
| {6, 1} | 7 | 0001010 | 0001010??????????? | 10240 | 11263 |
| {6, -1} | 7 | 0001011 | 0001011??????????? | 11264 | 12287 |
| {7, 1} | 7 | 0001000 | 0001000??????????? | 8192 | 9215 |
| {7, -1} | 7 | 0001001 | 0001001??????????? | 9216 | 10239 |
| {0, 4} | 8 | 00001100 | 00001100?????????? | 6144 | 6655 |
| {0, -4} | 8 | 00001101 | 00001101?????????? | 6656 | 7167 |
| {2, 2} | 8 | 00001000 | 00001000?????????? | 4096 | 4607 |
| {2, -2} | 8 | 00001001 | 00001001?????????? | 4608 | 5119 |
| {8, 1} | 8 | 00001110 | 00001110?????????? | 7168 | 7679 |
| {8, -1} | 8 | 00001111 | 00001111?????????? | 7680 | 8191 |
| {9, 1} | 8 | 00001010 | 00001010?????????? | 5120 | 5631 |
| {9, -1} | 8 | 00001011 | 00001011?????????? | 5632 | 6143 |

FIG.14

| DECODED DATA (RUN, LEVEL) | CODEWORD LENGTH | CODEWORD | BIT POSITION MATCHING CODE WORD | MINIMUM VALUE TABLE ADDRESS | MAXIMUM VALUE |
|---|---|---|---|---|---|
| {0,5} | 9 | 001001100 | 001001100??????? | 19456 | 19711 |
| {0,-5} | 9 | 001001101 | 001001101??????? | 19712 | 19967 |
| {0,6} | 9 | 001000010 | 001000010??????? | 16896 | 17151 |
| {0,-6} | 9 | 001000011 | 001000011??????? | 17152 | 17407 |
| {1,3} | 9 | 001001010 | 001001010??????? | 18944 | 19199 |
| {1,-3} | 9 | 001001011 | 001001011??????? | 19200 | 19455 |
| {3,2} | 9 | 001001000 | 001001000??????? | 18432 | 18687 |
| {3,-2} | 9 | 001001001 | 001001001??????? | 18688 | 18943 |
| {10,1} | 9 | 001001110 | 001001110??????? | 19968 | 20223 |
| {10,-1} | 9 | 001001111 | 001001111??????? | 20224 | 20479 |
| {11,1} | 9 | 001000110 | 001000110??????? | 17920 | 18175 |
| {11,-1} | 9 | 001000111 | 001000111??????? | 18176 | 18431 |
| {12,1} | 9 | 001000100 | 001000100??????? | 17408 | 17663 |
| {12,-1} | 9 | 001000101 | 001000101??????? | 17664 | 17919 |
| {13,1} | 9 | 001000000 | 001000000??????? | 16384 | 16639 |
| {13,-1} | 9 | 001000001 | 001000001??????? | 16640 | 16895 |
| {0,7} | 11 | 00000010100 | 00000010100????? | 1280 | 1343 |
| {0,-7} | 11 | 00000010101 | 00000010101????? | 1344 | 1407 |
| {1,4} | 11 | 00000011000 | 00000011000????? | 1536 | 1599 |
| {1,-4} | 11 | 00000011001 | 00000011001????? | 1600 | 1663 |
| {2,3} | 11 | 00000010110 | 00000010110????? | 1408 | 1471 |
| {2,-3} | 11 | 00000010111 | 00000010111????? | 1472 | 1535 |
| {4,2} | 11 | 00000011110 | 00000011110????? | 1920 | 1983 |
| {4,-2} | 11 | 00000011111 | 00000011111????? | 1984 | 2047 |
| {5,2} | 11 | 00000010010 | 00000010010????? | 1152 | 1215 |
| {5,-2} | 11 | 00000010011 | 00000010011????? | 1216 | 1279 |
| {14,1} | 11 | 00000011100 | 00000011100????? | 1792 | 1855 |
| {14,-1} | 11 | 00000011101 | 00000011101????? | 1856 | 1919 |
| {15,1} | 11 | 00000011010 | 00000011010????? | 1664 | 1727 |
| {15,-1} | 11 | 00000011011 | 00000011011????? | 1728 | 1791 |
| {16,1} | 11 | 00000010000 | 00000010000????? | 1024 | 1087 |
| {16,-1} | 11 | 00000010001 | 00000010001????? | 1088 | 1151 |

FIG.15

| (RUN, LEVEL) | CODEWORD LENGTH | CODEWORD | BIT POSITION MATCHING CODEWORD | MINIMUM VALUE TABLE ADDRESS | MAXIMUM VALUE |
|---|---|---|---|---|---|
| {0,8} | 13 | 0000000111010 | 0000000111010???? | 928 | 943 |
| {0,-8} | 13 | 0000000111011 | 0000000111011???? | 944 | 959 |
| {0,9} | 13 | 0000000110000 | 0000000110000???? | 768 | 783 |
| {0,-9} | 13 | 0000000110001 | 0000000110001???? | 784 | 799 |
| {0,10} | 13 | 0000000100110 | 0000000100110???? | 608 | 623 |
| {0,-10} | 13 | 0000000100111 | 0000000100111???? | 624 | 639 |
| {0,11} | 13 | 0000000100000 | 0000000100000???? | 512 | 527 |
| {0,-11} | 13 | 0000000100001 | 0000000100001???? | 528 | 543 |
| {1,5} | 13 | 0000000110110 | 0000000110110???? | 864 | 879 |
| {1,-5} | 13 | 0000000110111 | 0000000110111???? | 880 | 895 |
| {2,4} | 13 | 0000000101000 | 0000000101000???? | 640 | 655 |
| {2,-4} | 13 | 0000000101001 | 0000000101001???? | 656 | 671 |
| {3,3} | 13 | 0000000111000 | 0000000111000???? | 896 | 911 |
| {3,-3} | 13 | 0000000111001 | 0000000111001???? | 912 | 927 |
| {4,3} | 13 | 0000000100100 | 0000000100100???? | 576 | 591 |
| {4,-3} | 13 | 0000000100101 | 0000000100101???? | 592 | 607 |
| {6,2} | 13 | 0000000111100 | 0000000111100???? | 960 | 975 |
| {6,-2} | 13 | 0000000111101 | 0000000111101???? | 976 | 991 |
| {7,2} | 13 | 0000000101010 | 0000000101010???? | 672 | 687 |
| {7,-2} | 13 | 0000000101011 | 0000000101011???? | 688 | 703 |
| {8,2} | 13 | 0000000100010 | 0000000100010???? | 544 | 559 |
| {8,-2} | 13 | 0000000100011 | 0000000100011???? | 560 | 575 |
| {17,1} | 13 | 0000000111110 | 0000000111110???? | 992 | 1007 |
| {17,-1} | 13 | 0000000111111 | 0000000111111???? | 1008 | 1023 |
| {18,1} | 13 | 0000000110100 | 0000000110100???? | 832 | 847 |
| {18,-1} | 13 | 0000000110101 | 0000000110101???? | 848 | 863 |
| {19,1} | 13 | 0000000110010 | 0000000110010???? | 800 | 815 |
| {19,-1} | 13 | 0000000110011 | 0000000110011???? | 816 | 831 |
| {20,1} | 13 | 0000000101110 | 0000000101110???? | 736 | 751 |
| {20,-1} | 13 | 0000000101111 | 0000000101111???? | 752 | 767 |
| {21,1} | 13 | 0000000101100 | 0000000101100???? | 704 | 719 |
| {21,-1} | 13 | 0000000101101 | 0000000101101???? | 720 | 735 |

DECODED DATA

FIG.16

| {RUN,LEVEL} (DECODED DATA) | CODEWORD LENGTH | CODEWORD | BIT POSITION MATCHING CODEWORD | TABLE ADDRESS (MINIMUM VALUE) | TABLE ADDRESS (MAXIMUM VALUE) |
|---|---|---|---|---|---|
| {0,12} | 14 | 00000000110100 | 00000000110100??? | 416 | 423 |
| {0,-12} | 14 | 00000000110101 | 00000000110101??? | 424 | 431 |
| {0,13} | 14 | 00000000110010 | 00000000110010??? | 400 | 407 |
| {0,-13} | 14 | 00000000110011 | 00000000110011??? | 408 | 415 |
| {0,14} | 14 | 00000000110000 | 00000000110000??? | 384 | 391 |
| {0,-14} | 14 | 00000000110001 | 00000000110001??? | 392 | 399 |
| {0,15} | 14 | 00000000101110 | 00000000101110??? | 368 | 375 |
| {0,-15} | 14 | 00000000101111 | 00000000101111??? | 376 | 383 |
| {1,6} | 14 | 00000000101100 | 00000000101100??? | 352 | 359 |
| {1,-6} | 14 | 00000000101101 | 00000000101101??? | 360 | 367 |
| {1,7} | 14 | 00000000101010 | 00000000101010??? | 336 | 343 |
| {1,-7} | 14 | 00000000101011 | 00000000101011??? | 344 | 351 |
| {2,5} | 14 | 00000000101000 | 00000000101000??? | 320 | 327 |
| {2,-5} | 14 | 00000000101001 | 00000000101001??? | 328 | 335 |
| {3,4} | 14 | 00000000100110 | 00000000100110??? | 304 | 311 |
| {3,-4} | 14 | 00000000100111 | 00000000100111??? | 312 | 319 |
| {5,3} | 14 | 00000000100100 | 00000000100100??? | 288 | 295 |
| {5,-3} | 14 | 00000000100101 | 00000000100101??? | 296 | 303 |
| {9,2} | 14 | 00000000100010 | 00000000100010??? | 272 | 279 |
| {9,-2} | 14 | 00000000100011 | 00000000100011??? | 280 | 287 |
| {10,2} | 14 | 00000000100000 | 00000000100000??? | 256 | 263 |
| {10,-2} | 14 | 00000000100001 | 00000000100001??? | 264 | 271 |
| {22,1} | 14 | 00000000111110 | 00000000111110??? | 496 | 503 |
| {22,-1} | 14 | 00000000111111 | 00000000111111??? | 504 | 511 |
| {23,1} | 14 | 00000000111100 | 00000000111100??? | 480 | 487 |
| {23,-1} | 14 | 00000000111101 | 00000000111101??? | 488 | 495 |
| {24,1} | 14 | 00000000111010 | 00000000111010??? | 464 | 471 |
| {24,-1} | 14 | 00000000111011 | 00000000111011??? | 472 | 479 |
| {25,1} | 14 | 00000000111000 | 00000000111000??? | 448 | 455 |
| {25,-1} | 14 | 00000000111001 | 00000000111001??? | 456 | 463 |
| {26,1} | 14 | 00000000110110 | 00000000110110??? | 432 | 439 |
| {26,-1} | 14 | 00000000110111 | 00000000110111??? | 440 | 447 |

FIG.17

| (RUN, LEVEL) | CODEWORD LENGTH | CODEWORD | BIT POSITION MATCHING CODEWORD | TABLE ADDRESS MIN | MAX |
|---|---|---|---|---|---|
| {0,16} | 15 | 000000000111110 | 000000000111110?? | 248 | 251 |
| {0,-16} | 15 | 000000000111111 | 000000000111111?? | 252 | 255 |
| {0,17} | 15 | 000000000111100 | 000000000111100?? | 240 | 243 |
| {0,-17} | 15 | 000000000111101 | 000000000111101?? | 244 | 247 |
| {0,18} | 15 | 000000000111010 | 000000000111010?? | 232 | 235 |
| {0,-18} | 15 | 000000000111011 | 000000000111011?? | 236 | 239 |
| {0,19} | 15 | 000000000111000 | 000000000111000?? | 224 | 227 |
| {0,-19} | 15 | 000000000111001 | 000000000111001?? | 228 | 231 |
| {0,20} | 15 | 000000000110110 | 000000000110110?? | 216 | 219 |
| {0,-20} | 15 | 000000000110111 | 000000000110111?? | 220 | 223 |
| {0,21} | 15 | 000000000110100 | 000000000110100?? | 208 | 211 |
| {0,-21} | 15 | 000000000110101 | 000000000110101?? | 212 | 215 |
| {0,22} | 15 | 000000000110010 | 000000000110010?? | 200 | 203 |
| {0,-22} | 15 | 000000000110011 | 000000000110011?? | 204 | 207 |
| {0,23} | 15 | 000000000110000 | 000000000110000?? | 192 | 195 |
| {0,-23} | 15 | 000000000110001 | 000000000110001?? | 196 | 199 |
| {0,24} | 15 | 000000000101110 | 000000000101110?? | 184 | 187 |
| {0,-24} | 15 | 000000000101111 | 000000000101111?? | 188 | 191 |
| {0,25} | 15 | 000000000101100 | 000000000101100?? | 176 | 179 |
| {0,-25} | 15 | 000000000101101 | 000000000101101?? | 180 | 183 |
| {0,26} | 15 | 000000000101010 | 000000000101010?? | 168 | 171 |
| {0,-26} | 15 | 000000000101011 | 000000000101011?? | 172 | 175 |
| {0,27} | 15 | 000000000101000 | 000000000101000?? | 160 | 163 |
| {0,-27} | 15 | 000000000101001 | 000000000010100 ?? | 164 | 167 |
| {0,28} | 15 | 000000000100110 | 000000000100110?? | 152 | 155 |
| {0,-28} | 15 | 000000000100111 | 000000000100111?? | 156 | 159 |
| {0,29} | 15 | 000000000100100 | 000000000100100?? | 144 | 147 |
| {0,-29} | 15 | 000000000100101 | 000000000100101?? | 148 | 151 |
| {0,30} | 15 | 000000000100010 | 000000000100010?? | 136 | 139 |
| {0,-30} | 15 | 000000000100011 | 000000000100011?? | 140 | 143 |
| {0,31} | 15 | 000000000100000 | 000000000100000?? | 128 | 131 |
| {0,-31} | 15 | 000000000100001 | 000000000100001?? | 132 | 135 |

FIG.18

| DECODED DATA {RUN,LEVEL} | CODEWORD LENGTH | CODEWORD | BIT POSITION MATCHING CODEWORD | MINIMUM VALUE TABLE ADDRESS | MAXIMUM VALUE |
|---|---|---|---|---|---|
| {0,32} | 16 | 0000000000110000 | 0000000000110000? | 96 | 97 |
| {0,-32} | 16 | 0000000000110001 | 0000000000110001? | 98 | 99 |
| {0,33} | 16 | 0000000000101110 | 0000000000101110? | 92 | 93 |
| {0,-33} | 16 | 0000000000101111 | 0000000000101111? | 94 | 95 |
| {0,34} | 16 | 0000000000101100 | 0000000000101100? | 88 | 89 |
| {0,-34} | 16 | 0000000000101101 | 0000000000101101? | 90 | 91 |
| {0,35} | 16 | 0000000000101010 | 0000000000101010? | 84 | 85 |
| {0,-35} | 16 | 0000000000101011 | 0000000000101011? | 86 | 87 |
| {0,36} | 16 | 0000000000101000 | 0000000000101000? | 80 | 81 |
| {0,-36} | 16 | 0000000000101001 | 0000000000101001? | 82 | 83 |
| {0,37} | 16 | 0000000000100110 | 0000000000100110? | 76 | 77 |
| {0,-37} | 16 | 0000000000100111 | 0000000000100111? | 78 | 79 |
| {0,38} | 16 | 0000000000100100 | 0000000000100100? | 72 | 73 |
| {0,-38} | 16 | 0000000000100101 | 0000000000100101? | 74 | 75 |
| {0,39} | 16 | 0000000000100010 | 0000000000100010? | 68 | 69 |
| {0,-39} | 16 | 0000000000100011 | 0000000000100011? | 70 | 71 |
| {0,40} | 16 | 0000000000100000 | 0000000000100000? | 64 | 65 |
| {0,-40} | 16 | 0000000000100001 | 0000000000100001? | 66 | 67 |
| {1,8} | 16 | 0000000000111110 | 0000000000111110? | 124 | 125 |
| {1,-8} | 16 | 0000000000111111 | 0000000000111111? | 126 | 127 |
| {1,9} | 16 | 0000000000111100 | 0000000000111100? | 120 | 121 |
| {1,-9} | 16 | 0000000000111101 | 0000000000111101? | 122 | 123 |
| {1,10} | 16 | 0000000000111010 | 0000000000111010? | 116 | 117 |
| {1,-10} | 16 | 0000000000111011 | 0000000000111011? | 118 | 119 |
| {1,11} | 16 | 0000000000111000 | 0000000000111000? | 112 | 113 |
| {1,-11} | 16 | 0000000000111001 | 0000000000111001? | 114 | 115 |
| {1,12} | 16 | 0000000000110110 | 0000000000110110? | 108 | 109 |
| {1,-12} | 16 | 0000000000110111 | 0000000000110111? | 110 | 111 |
| {1,13} | 16 | 0000000000110100 | 0000000000110100? | 104 | 105 |
| {1,-13} | 16 | 0000000000110101 | 0000000000110101? | 106 | 107 |
| {1,14} | 16 | 0000000000110010 | 0000000000110010? | 100 | 101 |
| {1,-14} | 16 | 0000000000110011 | 0000000000110011? | 102 | 103 |

FIG.19

| (RUN,LEVEL) | CODEWORD LENGTH | CODEWORD | BIT POSITION MATCHING CODEWORD | TABLE ADDRESS MINIMUM VALUE | MAXIMUM VALUE |
|---|---|---|---|---|---|
| {1,15} | 17 | 00000000000100110 | 00000000000100110 | 38 | 38 |
| {1,-15} | 17 | 00000000000100111 | 00000000000100111 | 39 | 39 |
| {1,16} | 17 | 00000000000100100 | 00000000000100100 | 36 | 36 |
| {1,-16} | 17 | 00000000000100101 | 00000000000100101 | 37 | 37 |
| {1,17} | 17 | 00000000000100010 | 00000000000100010 | 34 | 34 |
| {1,-17} | 17 | 00000000000100011 | 00000000000100011 | 35 | 35 |
| {1,18} | 17 | 00000000000100000 | 00000000000100000 | 32 | 32 |
| {1,-18} | 17 | 00000000000100001 | 00000000000100001 | 33 | 33 |
| {6,3} | 17 | 00000000000101000 | 00000000000101000 | 40 | 40 |
| {6,-3} | 17 | 00000000000101001 | 00000000000101001 | 41 | 41 |
| {11,2} | 17 | 00000000000110100 | 00000000000110100 | 52 | 56 |
| {11,-2} | 17 | 00000000000110101 | 00000000000110101 | 53 | 57 |
| {12,2} | 17 | 00000000000110010 | 00000000000110010 | 50 | 50 |
| {12,-2} | 17 | 00000000000110011 | 00000000000110011 | 51 | 51 |
| {13,2} | 17 | 00000000000110000 | 00000000000110000 | 48 | 48 |
| {13,-2} | 17 | 00000000000110001 | 00000000000110001 | 49 | 49 |
| {14,2} | 17 | 00000000000101110 | 00000000000101110 | 46 | 46 |
| {14,-2} | 17 | 00000000000101111 | 00000000000101111 | 47 | 47 |
| {15,2} | 17 | 00000000000101100 | 00000000000101100 | 44 | 44 |
| {15,-2} | 17 | 00000000000101101 | 00000000000101101 | 45 | 45 |
| {16,2} | 17 | 00000000000101010 | 00000000000101010 | 42 | 42 |
| {16,-2} | 17 | 00000000000101011 | 00000000000101011 | 43 | 43 |
| {27,1} | 17 | 00000000000111110 | 00000000000111110 | 62 | 62 |
| {27,-1} | 17 | 00000000000111111 | 00000000000111111 | 63 | 63 |
| {28,1} | 17 | 00000000000111100 | 00000000000111100 | 60 | 60 |
| {28,-1} | 17 | 00000000000111101 | 00000000000111101 | 61 | 61 |
| {29,1} | 17 | 00000000000111010 | 00000000000111010 | 58 | 58 |
| {29,-1} | 17 | 00000000000111011 | 00000000000111011 | 59 | 59 |
| {30,1} | 17 | 00000000000111000 | 00000000000111000 | 56 | 56 |
| {30,-1} | 17 | 00000000000111001 | 00000000000111001 | 57 | 57 |
| {31,1} | 17 | 00000000000110110 | 00000000000110110 | 54 | 54 |
| {31,-1} | 17 | 00000000000110111 | 00000000000110111 | 55 | 55 |

FIG. 24

| DECODED DATA {RUN, LEVEL} | CODEWORD LENGTH | CODEWORD | BIT POSITION MATCHING CODEWORD | TABLE ADDRESS MINIMUM VALUE | MAXIMUM VALUE |
|---|---|---|---|---|---|
| {0,1}, EOB | 5 | 11010 | 11010???? | 416 | 431 |
| {0,-1}, EOB | 5 | 11110 | 11110???? | 480 | 495 |
| {1,1}, EOB | 6 | 011010 | 011010??? | 208 | 215 |
| {1,-1}, EOB | 6 | 011110 | 011110??? | 240 | 247 |
| {0,1}, {0,1} | 6 | 110110 | 110110??? | 432 | 439 |
| {0,1}, {0,-1} | 6 | 110111 | 110111??? | 440 | 447 |
| {0,-1}, {0,1} | 6 | 111110 | 111110??? | 496 | 503 |
| {0,-1}, {0,-1} | 6 | 111111 | 111111??? | 504 | 511 |
| {0,2}, EOB | 7 | 0100010 | 0100010?? | 136 | 139 |
| {0,-2}, EOB | 7 | 0100110 | 0100110?? | 152 | 155 |
| {2,1}, EOB | 7 | 0101010 | 0101010?? | 168 | 171 |
| {2,-1}, EOB | 7 | 0101110 | 0101110?? | 184 | 187 |
| {0,1}, {1,1} | 7 | 1100110 | 1100110?? | 408 | 411 |
| {0,1}, {1,-1} | 7 | 1100111 | 1100111?? | 412 | 415 |
| {0,-1}, {1,1} | 7 | 1110110 | 1110110?? | 472 | 475 |
| {0,-1}, {1,-1} | 7 | 1110111 | 1110111?? | 476 | 479 |
| {1,1}, {0,1} | 7 | 0110110 | 0110110?? | 216 | 219 |
| {1,1}, {0,-1} | 7 | 0110111 | 0110111?? | 220 | 223 |
| {1,-1}, {0,1} | 7 | 0111110 | 0111110?? | 248 | 251 |
| {1,-1}, {0,-1} | 7 | 0111111 | 0111111?? | 252 | 255 |
| {0,3}, EOB | 8 | 00101010 | 00101010? | 84 | 85 |
| {0,-3}, EOB | 8 | 00101110 | 00101110? | 92 | 93 |
| {3,1}, EOB | 8 | 00111010 | 00111010? | 116 | 117 |
| {3,-1}, EOB | 8 | 00111110 | 00111110? | 124 | 125 |
| {4,1}, EOB | 8 | 00110010 | 00110010? | 100 | 101 |
| {4,-1}, EOB | 8 | 00110110 | 0011010? | 104 | 105 |
| {0,1}, {0,2} | 8 | 11001000 | 11001000? | 400 | 401 |
| {0,1}, {0,-2} | 8 | 11001001 | 11001001? | 402 | 403 |
| {0,-1}, {0,2} | 8 | 11101000 | 11101000? | 464 | 465 |
| {0,-1}, {0,-2} | 8 | 11101001 | 11101001? | 466 | 467 |
| {0,1}, {2,1} | 8 | 11001010 | 11001010? | 404 | 405 |
| {0,1}, {2,-1} | 8 | 11001011 | 11001011? | 406 | 407 |
| {0,-1}, {2,1} | 8 | 11101010 | 11101010? | 468 | 469 |
| {0,-1}, {2,-1} | 8 | 11101011 | 11101011? | 470 | 471 |
| {1,1}, {1,1} | 8 | 01100110 | 01100110? | 204 | 205 |
| {1,1}, {1,-1} | 8 | 01100111 | 01100111? | 206 | 207 |
| {1,-1}, {1,1} | 8 | 01110110 | 01110110? | 236 | 237 |
| {1,-1}, {1,-1} | 8 | 01110111 | 01110111? | 238 | 239 |
| {0,2}, {0,1} | 8 | 01000110 | 01000110? | 140 | 141 |
| {0,2}, {0,-1} | 8 | 01000111 | 01000111? | 142 | 143 |
| {0,-2}, {0,1} | 8 | 01001110 | 01001110? | 156 | 157 |
| {0,-2}, {0,-1} | 8 | 01001111 | 01001111? | 158 | 159 |
| {2,1}, {0,1} | 8 | 01010110 | 01010110? | 172 | 173 |
| {2,1}, {0,-1} | 8 | 01010111 | 01010111? | 174 | 175 |
| {2,-1}, {0,1} | 8 | 01011110 | 01011110? | 188 | 189 |
| {2,-1}, {0,-1} | 8 | 01011111 | 01011111? | 190 | 191 |

FIG. 25

| DECODED DATA {RUN, LEVEL} | CODEWORD LENGTH | CODEWORD | BIT POSITION MATCHING CODEWORD | TABLE ADDRESS MINIMUM VALUE | TABLE ADDRESS MAXIMUM VALUE |
|---|---|---|---|---|---|
| {1,2}, EOB | 9 | 000110010 | 000110010 | 50 | 50 |
| {1,-2}, EOB | 9 | 000110110 | 000110110 | 54 | 54 |
| {5,1}, EOB | 9 | 000111010 | 000111010 | 58 | 58 |
| {5,-1}, EOB | 9 | 000111110 | 000111110 | 62 | 62 |
| {6,1}, EOB | 9 | 000101010 | 000101010 | 42 | 42 |
| {6,-1}, EOB | 9 | 000101110 | 000101110 | 46 | 46 |
| {7,1}, EOB | 9 | 000100010 | 000100010 | 34 | 34 |
| {7,-1}, EOB | 9 | 000100110 | 000100110 | 38 | 38 |
| {0,1}, {0,3} | 9 | 110001010 | 110001010 | 394 | 394 |
| {0,1}, {0,-3} | 9 | 110001011 | 110001011 | 395 | 395 |
| {0,-1}, {0,3} | 9 | 111001010 | 111001010 | 458 | 458 |
| {0,-1}, {0,-3} | 9 | 111001011 | 111001011 | 459 | 459 |
| {0,1}, {3,1} | 9 | 110001110 | 110001110 | 398 | 398 |
| {0,1}, {3,-1} | 9 | 110001111 | 110001111 | 399 | 399 |
| {0,-1}, {3,1} | 9 | 111001110 | 111001110 | 462 | 462 |
| {0,-1}, {3,-1} | 9 | 111001111 | 111001111 | 463 | 463 |
| {0,1}, {4,1} | 9 | 110001100 | 110001100 | 396 | 396 |
| {0,1}, {4,-1} | 9 | 110001101 | 110001101 | 397 | 397 |
| {0,-1}, {4,1} | 9 | 111001100 | 111001100 | 460 | 460 |
| {0,-1}, {4,-1} | 9 | 111001101 | 111001101 | 461 | 461 |
| {1,1}, {0,2} | 9 | 011001000 | 011001000 | 200 | 200 |
| {1,1}, {0,-2} | 9 | 011001001 | 011001001 | 201 | 201 |
| {1,-1}, {0,2} | 9 | 011101000 | 011101000 | 232 | 232 |
| {1,-1}, {0,-2} | 9 | 011101001 | 011101001 | 233 | 233 |
| {1,1}, {2,1} | 9 | 011001010 | 011001010 | 202 | 202 |
| {1,1}, {2,-1} | 9 | 011001011 | 011001011 | 203 | 203 |
| {1,-1}, {2,1} | 9 | 011101010 | 011101010 | 234 | 234 |
| {1,-1}, {2,-1} | 9 | 011101011 | 011101011 | 235 | 235 |
| {0,2}, {1,1} | 9 | 010000110 | 010000110 | 134 | 134 |
| {0,2}, {1,-1} | 9 | 010000111 | 010000111 | 135 | 135 |
| {0,-2}, {1,1} | 9 | 010010110 | 010010110 | 150 | 150 |
| {0,-2}, {1,-1} | 9 | 010010111 | 010010111 | 151 | 151 |
| {2,1}, {1,1} | 9 | 010100110 | 010100110 | 166 | 166 |
| {2,1}, {1,-1} | 9 | 010100111 | 010100111 | 167 | 167 |
| {2,-1}, {1,1} | 9 | 010110110 | 010110110 | 182 | 182 |
| {2,-1}, {1,-1} | 9 | 010110111 | 010110111 | 183 | 183 |
| {0,3}, {0,1} | 9 | 001010110 | 001010110 | 86 | 86 |
| {0,3}, {0,-1} | 9 | 001010111 | 001010111 | 87 | 87 |
| {0,-3}, {0,1} | 9 | 001011110 | 001011110 | 94 | 94 |
| {0,-3}, {0,-1} | 9 | 001011111 | 001011111 | 95 | 95 |
| {3,1}, {0,1} | 9 | 001110110 | 001110110 | 118 | 118 |
| {3,1}, {0,-1} | 9 | 001110111 | 001110111 | 119 | 119 |
| {3,-1}, {0,1} | 9 | 001111110 | 001111110 | 126 | 126 |
| {3,-1}, {0,-1} | 9 | 001111111 | 001111111 | 127 | 127 |
| {4,1}, {0,1} | 9 | 001100110 | 001100110 | 102 | 102 |
| {4,1}, {0,-1} | 9 | 001100111 | 001100111 | 103 | 103 |
| {4,-1}, {0,1} | 9 | 001101110 | 001101110 | 110 | 110 |
| {4,-1}, {0,-1} | 9 | 001101111 | 001101111 | 111 | 111 |

FIG.26

| DECODED DATA {RUN, LEVEL} | CODEWORD LENGTH | CODEWORD | BIT POSITION MATCHING CODEWORD | TABLE ADDRESS MINIMUM LEVEL | TABLE ADDRESS MAXIMUM LEVEL |
|---|---|---|---|---|---|
| EOB | 2 | 10 | 10??????? | 256 | 383 |
| {0,1} | 3 | 110 | 110?????? | 384 | 447 |
| {0,-1} | 3 | 111 | 111?????? | 448 | 511 |
| {1,1} | 4 | 0110 | 0110????? | 192 | 223 |
| {1,-1} | 4 | 0111 | 0111????? | 224 | 255 |
| {0,2} | 5 | 01000 | 01000???? | 128 | 143 |
| {0,-2} | 5 | 01001 | 01001???? | 144 | 159 |
| {2,1} | 5 | 01010 | 01010???? | 160 | 175 |
| {2,-1} | 5 | 01011 | 01011???? | 176 | 191 |
| {0,3} | 6 | 001010 | 001010??? | 80 | 87 |
| {0,-3} | 6 | 001011 | 001011??? | 88 | 95 |
| {3,1} | 6 | 001110 | 001110??? | 112 | 119 |
| {3,-1} | 6 | 001111 | 001111??? | 120 | 127 |
| {4,1} | 6 | 001100 | 001100??? | 96 | 103 |
| {4,-1} | 6 | 001101 | 001101??? | 104 | 111 |
| Escape | 6 | 000001 | 000001??? | 8 | 15 |
| {1,2} | 7 | 0001100 | 0001100?? | 48 | 51 |
| {1,-2} | 7 | 0001101 | 0001101?? | 52 | 55 |
| {5,1} | 7 | 0001110 | 0001110?? | 56 | 59 |
| {5,-1} | 7 | 0001111 | 0001111?? | 60 | 63 |
| {6,1} | 7 | 0001010 | 0001010?? | 40 | 43 |
| {6,-1} | 7 | 0001011 | 0001011?? | 44 | 47 |
| {7,1} | 7 | 0001000 | 0001000?? | 32 | 35 |
| {7,-1} | 7 | 0001001 | 0001001?? | 36 | 39 |
| {0,4} | 8 | 00001100 | 00001100? | 24 | 25 |
| {0,-4} | 8 | 00001101 | 00001101? | 26 | 27 |
| {2,2} | 8 | 00001000 | 00001000? | 16 | 17 |
| {2,-2} | 8 | 00001001 | 00001001? | 18 | 19 |
| {8,1} | 8 | 00001110 | 00001110? | 28 | 29 |
| {8,-1} | 8 | 00001111 | 00001111? | 30 | 31 |
| {9,1} | 8 | 00001010 | 00001010? | 20 | 21 |
| {9,-1} | 8 | 00001011 | 00001011? | 22 | 23 |
| {0,5} | 9 | 001001100 | 001001100 | 76 | 76 |
| {0,-5} | 9 | 001001101 | 001001101 | 77 | 77 |
| {0,6} | 9 | 001000010 | 001000010 | 66 | 66 |
| {0,-6} | 9 | 001000011 | 001000011 | 67 | 67 |
| {1,3} | 9 | 001001010 | 001001010 | 74 | 74 |
| {1,-3} | 9 | 001001011 | 001001011 | 75 | 75 |
| {3,2} | 9 | 001001000 | 001001000 | 72 | 72 |
| {3,-2} | 9 | 001001001 | 001001001 | 73 | 73 |
| {10,1} | 9 | 001001110 | 001001110 | 78 | 78 |
| {10,-1} | 9 | 001001111 | 001001111 | 79 | 79 |
| {11,1} | 9 | 001000110 | 001000110 | 70 | 70 |
| {11,-1} | 9 | 001000111 | 001000111 | 71 | 71 |
| {12,1} | 9 | 001000100 | 001000100 | 68 | 68 |
| {12,-1} | 9 | 001000101 | 001000101 | 69 | 69 |
| {13,1} | 9 | 001000000 | 001000000 | 64 | 64 |
| {13,-1} | 9 | 001000001 | 001000001 | 65 | 65 |

FIG.27

| DECODED DATA {RUN, LEVEL} | CODEWORD LENGTH | CODEWORD | TABLE ADDRESS |
|---|---|---|---|
| {0,7} | 11 | 00000010100 | 20 |
| {0,-7} | 11 | 00000010101 | 21 |
| {1,4} | 11 | 00000011000 | 24 |
| {1,-4} | 11 | 00000011001 | 25 |
| {2,3} | 11 | 00000010110 | 22 |
| {2,-3} | 11 | 00000010111 | 23 |
| {4,2} | 11 | 00000011110 | 30 |
| {4,-2} | 11 | 00000011111 | 31 |
| {5,2} | 11 | 00000010010 | 18 |
| {5,-2} | 11 | 00000010011 | 19 |
| {14,1} | 11 | 00000011100 | 28 |
| {14,-1} | 11 | 00000011101 | 29 |
| {15,1} | 11 | 00000011010 | 26 |
| {15,-1} | 11 | 00000011011 | 27 |
| {16,1} | 11 | 00000010000 | 16 |
| {16,-1} | 11 | 00000010001 | 17 |

FIG. 28

| DECODED DATA (RUN, LEVEL) | CODE WORD LENGTH | CODE WORD | TABLE ADDRESS |
|---|---|---|---|
| {0,8} | 13 | 0000000111010 | 58 |
| {0,-8} | 13 | 0000000111011 | 59 |
| {0,9} | 13 | 0000000110000 | 48 |
| {0,-9} | 13 | 0000000110001 | 49 |
| {0,10} | 13 | 0000000100110 | 38 |
| {0,-10} | 13 | 0000000100111 | 39 |
| {0,11} | 13 | 0000000100000 | 32 |
| {0,-11} | 13 | 0000000100001 | 33 |
| {1,5} | 13 | 0000000110110 | 54 |
| {1,-5} | 13 | 0000000110111 | 55 |
| {2,4} | 13 | 0000000101000 | 40 |
| {2,-4} | 13 | 0000000101001 | 41 |
| {3,3} | 13 | 0000000111000 | 56 |
| {3,-3} | 13 | 0000000111001 | 57 |
| {4,3} | 13 | 0000000100100 | 36 |
| {4,-3} | 13 | 0000000100101 | 37 |
| {6,2} | 13 | 0000000111100 | 60 |
| {6,-2} | 13 | 0000000111101 | 61 |
| {7,2} | 13 | 0000000101010 | 42 |
| {7,-2} | 13 | 0000000101011 | 43 |
| {8,2} | 13 | 0000000100010 | 34 |
| {8,-2} | 13 | 0000000100011 | 35 |
| {17,1} | 13 | 0000000111110 | 62 |
| {17,-1} | 13 | 0000000111111 | 63 |
| {18,1} | 13 | 0000000110100 | 52 |
| {18,-1} | 13 | 0000000110101 | 53 |
| {19,1} | 13 | 0000000110010 | 50 |
| {19,-1} | 13 | 0000000110011 | 51 |
| {20,1} | 13 | 0000000101110 | 46 |
| {20,-1} | 13 | 0000000101111 | 47 |
| {21,1} | 13 | 0000000101100 | 44 |
| {21,-1} | 13 | 0000000101101 | 45 |

FIG. 29

| DECODED DATA (RUN, LEVEL) | CODEWORD LENGTH | CODEWORD | TABLE ADDRESS |
|---|---|---|---|
| {0,12} | 14 | 00000000110100 | 52 |
| {0,-12} | 14 | 00000000110101 | 53 |
| {0,13} | 14 | 00000000110010 | 50 |
| {0,-13} | 14 | 00000000110011 | 51 |
| {0,14} | 14 | 00000000110000 | 48 |
| {0,-14} | 14 | 00000000110001 | 49 |
| {0,15} | 14 | 00000000101110 | 46 |
| {0,-15} | 14 | 00000000101111 | 47 |
| {1,6} | 14 | 00000000101100 | 44 |
| {1,-6} | 14 | 00000000101101 | 45 |
| {1,7} | 14 | 00000000101010 | 42 |
| {1,-7} | 14 | 00000000101011 | 43 |
| {2,5} | 14 | 00000000101000 | 40 |
| {2,-5} | 14 | 00000000101001 | 41 |
| {3,4} | 14 | 00000000100110 | 38 |
| {3,-4} | 14 | 00000000100111 | 39 |
| {5,3} | 14 | 00000000100100 | 36 |
| {5,-3} | 14 | 00000000100101 | 37 |
| {9,2} | 14 | 00000000100010 | 34 |
| {9,-2} | 14 | 00000000100011 | 35 |
| {10,2} | 14 | 00000000100000 | 32 |
| {10,-2} | 14 | 00000000100001 | 33 |
| {22,1} | 14 | 00000000111110 | 62 |
| {22,-1} | 14 | 00000000111111 | 63 |
| {23,1} | 14 | 00000000111100 | 60 |
| {23,-1} | 14 | 00000000111101 | 61 |
| {24,1} | 14 | 00000000111010 | 58 |
| {24,-1} | 14 | 00000000111011 | 59 |
| {25,1} | 14 | 00000000111000 | 56 |
| {25,-1} | 14 | 00000000111001 | 57 |
| {26,1} | 14 | 00000000110110 | 54 |
| {26,-1} | 14 | 00000000110111 | 55 |

FIG.30

| DECODED DATA {RUN, LEVEL} | CODEWORD LENGTH | CORDWORD | TABLE ADDRESS |
|---|---|---|---|
| {0,16} | 15 | 000000000111110 | 62 |
| {0,-16} | 15 | 000000000111111 | 63 |
| {0,17} | 15 | 000000000111100 | 60 |
| {0,-17} | 15 | 000000000111101 | 61 |
| {0,18} | 15 | 000000000111010 | 58 |
| {0,-18} | 15 | 000000000111011 | 59 |
| {0,19} | 15 | 000000000111000 | 56 |
| {0,-19} | 15 | 000000000111001 | 57 |
| {0,20} | 15 | 000000000110110 | 54 |
| {0,-20} | 15 | 000000000110111 | 55 |
| {0,21} | 15 | 000000000110100 | 52 |
| {0,-21} | 15 | 000000000110101 | 53 |
| {0,22} | 15 | 000000000110010 | 50 |
| {0,-22} | 15 | 000000000110011 | 51 |
| {0,23} | 15 | 000000000110000 | 48 |
| {0,-23} | 15 | 000000000110001 | 49 |
| {0,24} | 15 | 000000000101110 | 46 |
| {0,-24} | 15 | 000000000101111 | 47 |
| {0,25} | 15 | 000000000101100 | 44 |
| {0,-25} | 15 | 000000000101101 | 45 |
| {0,26} | 15 | 000000000101010 | 42 |
| {0,-26} | 15 | 000000000101011 | 43 |
| {0,27} | 15 | 000000000101000 | 40 |
| {0,-27} | 15 | 000000000101001 | 41 |
| {0,28} | 15 | 000000000100110 | 38 |
| {0,-28} | 15 | 000000000100111 | 39 |
| {0,29} | 15 | 000000000100100 | 36 |
| {0,-29} | 15 | 000000000100101 | 37 |
| {0,30} | 15 | 000000000100010 | 34 |
| {0,-30} | 15 | 000000000100011 | 35 |
| {0,31} | 15 | 000000000100000 | 32 |
| {0,-31} | 15 | 000000000100001 | 33 |

FIG.31

| DECODED DATA {RUN, LEVEL} | CODEWORD LENGTH | CODEWORD | TABLE ADDRESS |
|---|---|---|---|
| {0, 32} | 16 | 0000000000110000 | 48 |
| {0,-32} | 16 | 0000000000110001 | 49 |
| {0, 33} | 16 | 0000000000101110 | 46 |
| {0,-33} | 16 | 0000000000101111 | 47 |
| {0, 34} | 16 | 0000000000101100 | 44 |
| {0,-34} | 16 | 0000000000101101 | 45 |
| {0, 35} | 16 | 0000000000101010 | 42 |
| {0,-35} | 16 | 0000000000101011 | 43 |
| {0, 36} | 16 | 0000000000101000 | 40 |
| {0,-36} | 16 | 0000000000101001 | 41 |
| {0, 37} | 16 | 0000000000100110 | 38 |
| {0,-37} | 16 | 0000000000100111 | 39 |
| {0, 38} | 16 | 0000000000100100 | 36 |
| {0,-38} | 16 | 0000000000100101 | 37 |
| {0, 39} | 16 | 0000000000100010 | 34 |
| {0,-39} | 16 | 0000000000100011 | 35 |
| {0, 40} | 16 | 0000000000100000 | 32 |
| {0,-40} | 16 | 0000000000100001 | 33 |
| {1, 8} | 16 | 0000000000111110 | 62 |
| {1,-8} | 16 | 0000000000111111 | 63 |
| {1, 9} | 16 | 0000000000111100 | 60 |
| {1,-9} | 16 | 0000000000111101 | 61 |
| {1, 10} | 16 | 0000000000111010 | 58 |
| {1,-10} | 16 | 0000000000111011 | 59 |
| {1, 11} | 16 | 0000000000111000 | 56 |
| {1,-11} | 16 | 0000000000111001 | 57 |
| {1, 12} | 16 | 0000000000110110 | 54 |
| {1,-12} | 16 | 0000000000110111 | 55 |
| {1, 13} | 16 | 0000000000110100 | 52 |
| {1,-13} | 16 | 0000000000110101 | 53 |
| {1, 14} | 16 | 0000000000110010 | 50 |
| {1,-14} | 16 | 0000000000110011 | 51 |

FIG.32

| DECODED DATA {RUN, LEVEL} | CODEWORD LENGTH | CODEWORD | TABLE ADDRESS |
|---|---|---|---|
| {1,15} | 17 | 00000000000100110 | 38 |
| {1,-15} | 17 | 00000000000100111 | 39 |
| {1,16} | 17 | 00000000000100100 | 36 |
| {1,-16} | 17 | 00000000000100101 | 37 |
| {1,17} | 17 | 00000000000100010 | 34 |
| {1,-17} | 17 | 00000000000100011 | 35 |
| {1,18} | 17 | 00000000000100000 | 32 |
| {1,-18} | 17 | 00000000000100001 | 33 |
| {6,3} | 17 | 00000000000101000 | 40 |
| {6,-3} | 17 | 00000000000101001 | 41 |
| {11,2} | 17 | 00000000000110100 | 52 |
| {11,-2} | 17 | 00000000000110101 | 53 |
| {12,2} | 17 | 00000000000110010 | 50 |
| {12,-2} | 17 | 00000000000110011 | 51 |
| {13,2} | 17 | 00000000000110000 | 48 |
| {13,-2} | 17 | 00000000000110001 | 49 |
| {14,2} | 17 | 00000000000101110 | 46 |
| {14,-2} | 17 | 00000000000101111 | 47 |
| {15,2} | 17 | 00000000000101100 | 44 |
| {15,-2} | 17 | 00000000000101101 | 45 |
| {16,2} | 17 | 00000000000101010 | 42 |
| {16,-2} | 17 | 00000000000101011 | 43 |
| {27,1} | 17 | 00000000000111110 | 62 |
| {27,-1} | 17 | 00000000000111111 | 63 |
| {28,1} | 17 | 00000000000111100 | 60 |
| {28,-1} | 17 | 00000000000111101 | 61 |
| {29,1} | 17 | 00000000000111010 | 58 |
| {29,-1} | 17 | 00000000000111011 | 59 |
| {30,1} | 17 | 00000000000111000 | 56 |
| {30,-1} | 17 | 00000000000111001 | 57 |
| {31,1} | 17 | 00000000000110110 | 54 |
| {31,-1} | 17 | 00000000000110111 | 55 |

SYSTEM AND METHOD FOR DECODING SIGNAL AND METHOD OF GENERATING LOOKUP TABLE FOR USING IN SIGNAL DECODING PROCESS

BACKGROUND OF THE INVENTION

1. Field of the Invention

The present invention relates to a signal decoding system, a signal decoding method and a generation method of a lookup table for using in a signal decoding process. More specifically, the invention relates to a signal decoding system and a signal decoding method for performing a block decoding process of DCT coefficients.

2. Description of the Related Art

In general, upon encoding a video signal, video compression standards, such as MPEG (Moving Picture Experts Group) (1995, ISO/IEOp13818.2) and so forth have been widely used. In MPEG, a transform coding and a motion compensation are central principles for compression. Amongst, the transform coding is performed in the following manner. At first, a region of vertical eight pixels and horizontal eight pixels is referred to a pixel block. For the pixel block, a two-dimensional discrete cosine transformation (DCT) is performed to obtain a DCT coefficient block as a 8 by 8 matrix of DCT coefficients. Next, each coefficient in the DCT coefficient block is quantized on the basis of a predetermined quantization step. Each coefficient in the DCT coefficient block after quantization, are scanned in a predetermined scanning order for Huffman coding a set of the number, of successive zero coefficients (run) and a quantized value of the subsequent non-zero coefficient (level). The foregoing is the mechanism of coding.

On the other hand, on a decoding side, a bit stream thus coded is decoded in the following manner. At first, from the bit stream as a sequence of codewords, the code word is parsed. By performing a variable length decoding for the codeword, the corresponding set of the run and the level is obtained. Then, at a position in the block designated by a scanning order and the run, a inversely quantized value of the level is stored. In the foregoing block, in the position where the inversely quantized value is not stored, a value "zero (0)" is stored.

Here, inverse quantization is a process for obtaining a DCT coefficient by performing multiplication of a predetermined quantization step and an element of quantization matrix after a correction of the doubled value of the level, and dividing the multiplication result by "16" (decimal number). It should be noted that the inverse quantization is defined by an MPEG standard.

In the following disclosure, the foregoing series of process will be referred to as a DCT coefficient block decoding. For the DCT coefficient block decoded as set forth above, an inverse discrete cosine transformation is performed to obtain a desired pixel block.

Conventionally, each process in the DCT coefficient block decoding is performed per each one block. FIG. 34 is a block diagram showing a construction of the conventional DCT coefficient block decoding system.

In FIG. 34, the conventional system includes a variable-length decoding unit 202 sequentially performing a variable-length decoding with serially reading a bit stream 201 to obtain a set of the run and the level in one block, a storage unit 204 storing the level or the value "0" at an appropriate position in the block on the basis of an obtained set 203 of the run and the level in one block and outputting a block 205, a inverse quantizing unit 206 performing inverse quantization for each coefficient in the block 205 for obtaining a DCT coefficient block 207. The variable-length decoding unit 202 includes a lookup table taking a set of the run and the level corresponding to one codeword and the codeword length as a table element.

Next, operation will be discussed with reference to FIG. 34. The bit stream 201 is inputted into the variable-length decoding unit 202. In the variable length decoding unit 205, a bit string which has a maximum length of one codeword is parsed from the bit stream 201, and then, a table element is specified for outputting the run and the level by using the parsed string as the table address.

Furthermore, using the code word length obtained by looking up the table, the lead of the next codeword is specified among the bit stream 201. The foregoing operation is repeated until a codeword "End Of Block (EOB)" which indicates the end of the non-zero coefficient appears. And, set 203 of the run and the level in one block is outputted.

In the storage unit 204, a DCT coefficient block where all coefficients have value "0" is preliminarily prepared. In the position determined by a scanning order and the run in the DCT coefficient block, the level is stored sequentially. The block 205 storing the levels in one block is inputted into the inverse quantizing unit 206. In the inverse quantizing unit 206, inverse quantization is performed with respect to all coefficients in the 8 by 8 matrix to output the DCT coefficient block 207.

On the other hand, a technique for speeding up variable-length decoding in the DCT coefficient block decoding has been disclosed in "Superscalar Huffman Decoder hardware Design" (SPIE Vol. 2186, Image and Video Compression, pp. 38–47, 1994). In the above-identified publication, speeding up of variable-length decoding is achieved by simultaneously decoding multiple codewords.

FIG. 35 is a block diagram showing a construction of another conventional variable-length decoding system. In FIG. 35, the conventional system includes a bit string buffer 502 storing a bit stream 501, a table looking-up unit 504 for variable-length decoding and a lookup table 507.

In the bit string buffer 502, the bit stream 501 and an output 505 of the table looking-up unit 504 are inputted and a 17-bit string 503 whose length is maximum of one codeword is outputted.

The lookup table 507 has the table address 506 as the input and outputs the table element 508 identified by the address. The lookup table 507 is a table whose element has the set of the run and the level and a total codeword length corresponding to multiple codewords, and is constructed to obtain the sets of the run and the level and the total codeword length corresponding to all code codewords contained is the 17-bit string 506 by only one lookup operation.

The table looking-up unit 504 has a seventeen bit output 503 of the bit string buffer 502 as the input and outputs a bit string 503 as the table address 506. On the other hand, the table looking-up unit 54 has the table element 508 as the input and outputs multiple runs 509 and multiple levels 510 contained in the table element 508. Furthermore, the table looking-up unit 504 outputs a bit string 505 in which decoded codewords are excluded from the bit string 503.

Next, the opperation of the conventional system set forth above will be discussed with reference to FIG. 35. At first, the bit stream 501 is stored in the bit string buffer 502. The bit string buffer 5022 outputs the 17-bit string 503 from the lead of the bit stream 501 stored therein. The 17-bit string 503 is outputted as the table address 506 in the table looking-up unit 504. Then, by using the table address 506, the table element 508 in the lookup table 507 is identified. The obtained table element 508 is outputted as multiple runs 509 and multiple levels 510 in the table looking-up unit 504. In the table looking-up unit 504, further by using the total codeword length, the bit string 505 in which the decoded codewords are excluded from the 17-bit string 503 is returned to the bit string buffer 502. In the bit string buffer 502, the bit string 505 is concatenated with the lead of the stored bit stream 501.

AS shown in FIG. 34, the conventional DCT coefficient block decoding unit cannot start decoding the next codeword until the length of the codeword which is decoded currently is specified. Therefore, the variable-length decoding inherently becomes sequential processing per each codeword, so that the processing speed decreases.

On the other hand, as shown in FIG. 35, in the DCT coefficient block decoding, when all codewords contained in the 17-bit string read from the bit stream are decoded simultaneously, a huge amount of memory is necessary for the lookup table. Particularly, when the variable-length decoding is implemented as a software of a microprocessor, decoding performance may be degraded by cache-miss.

SUMMARY OF THE INVENTION

The present invention has been worked out for solving the drawbacks in the prior art. Therefore, it is an object of the present invention to provide a signal decoding system, a signal decoding method and a generation method of a lookup table for a signal decoding process which can achieve DCT coefficient block decoding at high speed.

According to the first aspect of the present invention, a signal decoding system comprises decoding means for simultaneously performing variable length decoding process for multiple codewords; and inverse quantization means for inversely quantizing multiple results obtained by the decoding means in parallel.

According to the second aspect of the present invention, a signal decoding method comprises:

decoding step of simultaneously performing variable length decoding process for multiple codewords; and inverse quantization step of inversely quantizing multiple results obtained by the decoding means in parallel.

According to the third aspect of the present invention, a method of generating a lookup table to be used in variable length decoding, comprises:

step of, when concatenated two codewords equals a prefix in K bit (K is an integer greater than or equal to two and less than seventeen) representation of a table address value, runs and levels respectively corresponding to the two code words and the total length of concatenated two codewords are stored in the corresponding table address;

step of, when concatenated two codewords do not equals a prefix in K bit representation of a table address value and when the first one of the two codewords equals a prefix of the K bit representation, run and level corresponding to the one codeword and the length of the codeword are stored in the corresponding table address;

step of, when concatenated two codewords do not equal a prefix in K bit representation of a table address value and when the first one of the two codewords does not equals the prefix of the K bit representation, a dummy data is stored in the table address, the steps being performed for all table addresses of the lookup table.

In short, in the present invention, variable length decoding and inverse quantization for multiple codewords are performed in parallel. More particularly, variable length decoding of multiple codewords is performed simultaneously, and inverse quantization of multiple levels obtained by the decoding means can be performed in parallel. Thus, by performing variable length decoding and inverse quantization for multiple codewords simultaneously, variable length decoding in one by one basis can be avoided to improve processing speed of the DCT coefficient block decoding. Besides, by performing inverse quantization only for the levels, the DCT coefficient block decoding can be speeded up in comparison with the conventional system.

On the other hand, by restricting the number of codewords decoded simultaneously to be less than or equal to two and using the lookup table having small memory capacity, memory cost can be reduced. Particularly, when the variable length decoding is implemented by software of a microprocessor, decoding performance can be degraded due to cache miss. In addition, by combining parallel variable length decoding means and parallel inverse quantization means, faster DCT coefficient block decoding can be achieved comparing with the conventional system. It should be noted that the inverse quantization means are suitable for software implementation on the microprocessors which have parallel operation instructions.

BRIEF DESCRIPTION OF THE DRAWINGS

The present invention will be understood more fully from the detailed description given herebelow and from the accompanying drawings of the preferred embodiment of the present invention, which should not be taken to be limitative to the invention, but are for explanation and understanding only.

In the drawings:

FIG. 6 is an illustration showing a decoded data and codeword length corresponding to a codeword whose length is greater than or equal to two and less than or equal to nine in a Huffman code table for DCT coefficient in MPEG standard;

FIG. 7 is an illustration showing a decoded data and codeword length corresponding to a codeword whose length is eleven or thirteen in a Huffman code table for DCT coefficient in MPEG standard;

FIG. 8 is an illustration showing a decoded data and codeword length corresponding to a codeword whose length is fourteen in a Huffman code table for DCT coefficient in MPEG standard;

FIG. 9 is an illustration showing a decoded data and codeword length corresponding to a codeword whose length is fifteen in a Huffman code table for DCT coefficient in MPEG standard;

FIG. 10 is an illustration showing a decoded data and codeword length corresponding to a codeword whose length is sixteen in a Huffman code table for DCT coefficient in MPEG standard;

FIG. 11 is an illustration showing a decoded data and codeword length corresponding to a codeword whose length is seventeen in a Huffman code table for DCT coefficient in MPEG standard;

FIG. 12 is an illustration showing a decoded data, a codeword length, a bit position matching codeword and a table address corresponding to two codewords whose total codeword length is greater than or equal to five and less than or equal to seven, or the codeword whose length is greater than or equal to two and less than or equal to five in a lookup table for parallel decoding in FIG. 1;

FIG. 13 is an illustration showing a decoded data, a codeword length, a bit position matching codeword and a table address corresponding to the codeword whose length is greater than or equal to six and less than or equal to eight in a lookup table for parallel decoding in FIG. 1;

FIG. 14 is an illustration showing a decoded data, a codeword length, a bit position matching codeword and a table address corresponding to the codeword whose length is nine or eleven in a lookup table for parallel decoding in FIG. 1;

FIG. 15 is an illustration showing a decoded data, a codeword length, a bit position matching codeword and a table address corresponding to the codeword whose length is thirteen in a lookup table for parallel decoding in FIG. 1;

FIG. 16 is an illustration showing a decoded data, a codeword length, a bit position matching codeword and a table address corresponding to the codeword whose length is fourteen in a lookup table for parallel decoding in FIG. 1;

FIG. 17 is an illustration showing a decoded data, a codeword length, a bit position matching codeword and a table address corresponding to the codeword whose length is fifteen in a lookup table for parallel decoding in FIG. 1;

FIG. 18 is an illustration showing a decoded data, a codeword length, a bit position matching codeword and a table address corresponding to the codeword whose length is sixteen in a lookup table for parallel decoding in FIG. 1;

FIG. 19 is an illustration showing a decoded data, a codeword length, a bit position matching codeword and a table address corresponding to the codeword whose length is seventeen in a lookup table for parallel decoding in FIG. 1;

FIG. 24 is an illustration showing a decoded data, a codeword length, a bit position matching codeword and a table address corresponding to two codewords whose total code word length is greater than or equal to five and less than or equal to eight in the lookup table for parallel decoding in the present invention;

FIG. 25 is an illustration showing a decoded data, a codeword length, a bit position matching codeword and a table address corresponding to two codewords whose total codeword length is nine in the lookup table for parallel decoding in the present invention;

FIG. 26 is an illustration showing a decoded data, a codeword length, a bit position matching codeword and a table address corresponding to a codeword whose length is greater than or equal to two and less than or equal to nine in the lookup table for parallel decoding in the present invention;

FIG. 27 is an illustration showing a decoded data, a codeword length, a bit position matching codeword and a table address corresponding to a codeword whose length is eleven in the lookup table for parallel decoding in the present invention;

FIG. 28 is an illustration showing a decoded data, a codeword length, a bit position matching codeword and a table address corresponding to a codeword whose length is thirteen in the lookup table for parallel decoding in the present invention;

FIG. 29 is an illustration showing a decoded data, a codeword length, a bit position matching codeword and a table address corresponding to a codeword whose length is fourteen in the lookup table for parallel decoding in the present invention;

FIG. 30 is an illustration showing a decoded data, a codeword length, a bit position matching codeword and a table address corresponding to a codeword whose length is fifteen in the lookup table for parallel decoding in the present invention;

FIG. 31 is an illustration showing a decoded data, a codeword length, a bit position matching codeword and a table address corresponding to a codeword whose length is sixteen in the lookup table for parallel decoding in the present invention;

FIG. 32 is an illustration showing a decoded data, a codeword length, a bit position matching codeword and a table address corresponding to a codeword whose length is seventeen in the lookup table for parallel decoding in the present invention;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, for those skilled in the art that the present invention may be practiced without these specific details. In other instance, well-known structures are not shown in detail in order to avoid unnecessarily obscuring the present invention.

Figure 1:
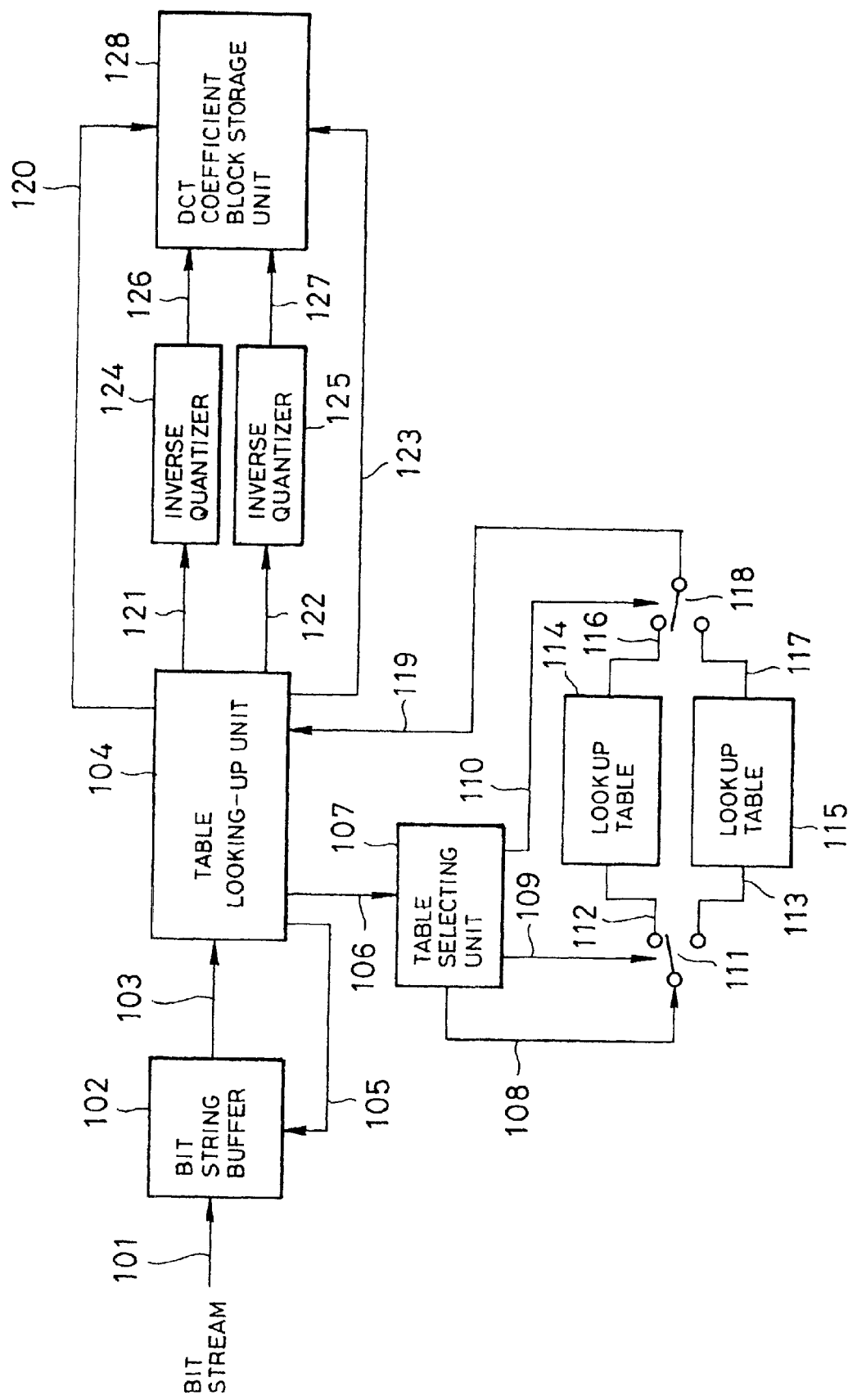
FIG. 1 is a block diagram showing a construction of one embodiment of a signal decoding system according to the present invention.

FIG. 1 is a block diagram showing one embodiment of a signal decoding system according to the present invention, in which a construction example of an image signal decoding system is illustrated. In FIG. 1, the shown embodiment of the signal decoding system includes a bit string buffer 102 for temporarily holding an input bit stream 101, a table looking-up unit 104 for variable-length decoding, lookup tables 114 and 115, a table selecting unit 107 for selecting these tables, inverse quantizers 124 and 125 for inversely quantizing the levels obtained by making reference to one of lookup tables 114, 115, and a DCT coefficient block storage unit 128 for storing the result of inverse quantization in a DCT coefficient block.

In the bit string buffer 102, the bit stream 101 and an output 105 of the table looking-up unit 104 are inputted and a 17-bit string 103 whose length is a maximum of one codeword length is outputted.

The looking-up table 114 is a table whose elements have two sets of runs and levels corresponding to two codewords and their total codeword length or a set of run and level corresponding one codeword and the codeword length. The lookup table 114 has a table address 112 as the input and outputs a table element 116 identified by the table address 112.

Similarly, the lookup table 115 is a table whose elements have a set of the run and the level corresponding to one code word and the code word length. The lookup table 115 has a table address 113 as the input and outputs a table element 117 identified by the table address 113.

The table looking-up unit 104 outputs a leading bit 103 of the bit string butter 102 as a bit string 106. On the other hand, a table element 119 which is a looking-up result is inputted into the table looking-up unit 104.

In addition, the table looking-up unit 104 outputs two runs 120, 123 and two levels 121, 122 contained in the table element 119. Then, the table looking-up unit 104 obtains a bit string 105 in which the codewords used for looking-up the table are excluded from the bit string 103 by using the codeword length, and returns the string 105 to the bit string buffer 102.

The table selecting unit 107 derives an address 108 from the output 106 of the table looking-up unit 104, and outputs control signals 109 and 110 for switching switches 111 and 118 to select one of the lookup tables 114 and 115. The control signals 109 and 110 are set to "0" when the table 114 is to be selected and set to "1" when the table 115 is to be selected.

The inverse quantizer 124 has the level 121 as the input and outputs a result 126 of inverse quantization. Similarly, the inverse quantizer 125 has the level 122 as the input and outputs a result 127 of inverse quantization.

The DCT coefficient block storage unit 128 has two inverse quantization results 126 and 127 and runs 120 and 123 as the input and stores the inverse quantization results 126 and 127 in block's positions designated by the scanning order and two runs 120 and 123.

Figure 2:
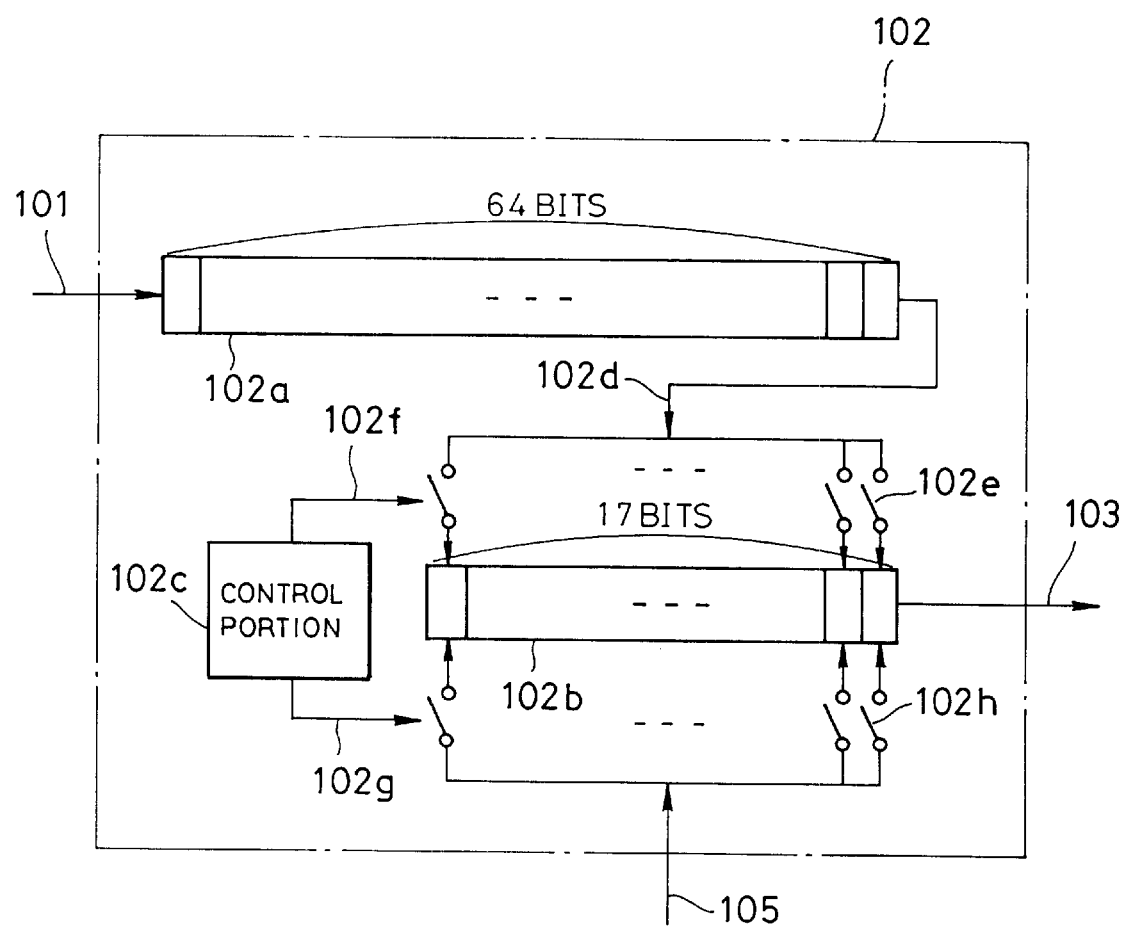
FIG. 2 is a block diagram showing an example of construction of a bit string buffer in FIG. 1.

Here, referring to FIG. 2, the bit string buffer 102 is constructed with a buffer 102a temporarily holding a 64-bit string, a buffer 102b temporarily holding a 17-bit string and a control portion 102c putting an input 102d from the buffer 102a and an input 105 from the table looking-up unit 104 into the buffer 102b. A bit string parsed from the input bit stream is inputted into the buffer 102a. The bit string 102d whose length is based on the control signal 102f from the control portion 102c is outputted. The 17-bit string 103 is outputted from the bit string buffer 102b. Thereafter, the bit string 102d and the bit string 105 are inputted into the buffer 102b. The control portion 102c controls switch groups 102e and 102h through a control signals 102f and 102g so that the bit string 105 and the bit string 102d are stored at the appropriate positions.

Figure 3:
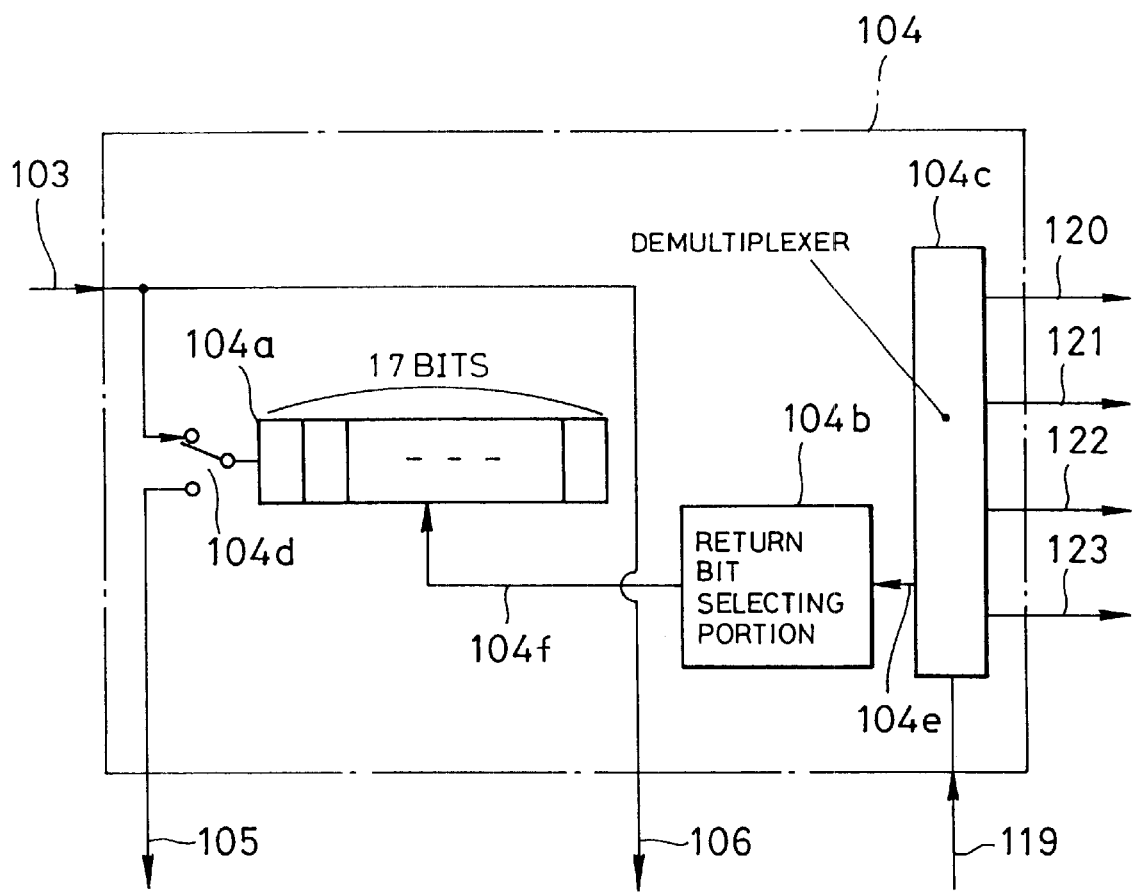
FIG. 3 is a block diagram showing an example of a construction of a table looking-up unit of FIG. 1.

Referring to FIG. 3, the table looking-up unit 104 includes a buffer 104a for temporarily holding a 17-bit string, a return bit selecting portion 104b for controlling the bit string 105 to be returned to the bit string buffer 102, and a demultiplexer 104c outputting two runs 120 and 123, two levels 121 and 122 and the codeword length 104e in the table element 119. The 17-bit output 103 of the bit string buffer 102 is inputted into the buffer 104a. The buffer 104a outputs the bit string 105 of an appropriate length based on the control signal 104f of the return bit selecting portion 104b. Input and output is switched by the switch 104d.

The codeword length 104e obtained by table looking-up is inputted into the return bit selecting portion 104b. Then, the return bit selecting portion 104b outputs the control signal 104f for outputting the bit string 105 in which the codeword used for table looking-up is excluded from the contents of the buffer 104a. The demultiplexer 104c outputs the input table element 119 as the runs 120 and 123, the levels 121 and 122 and the codeword length 104e.

Figure 4:
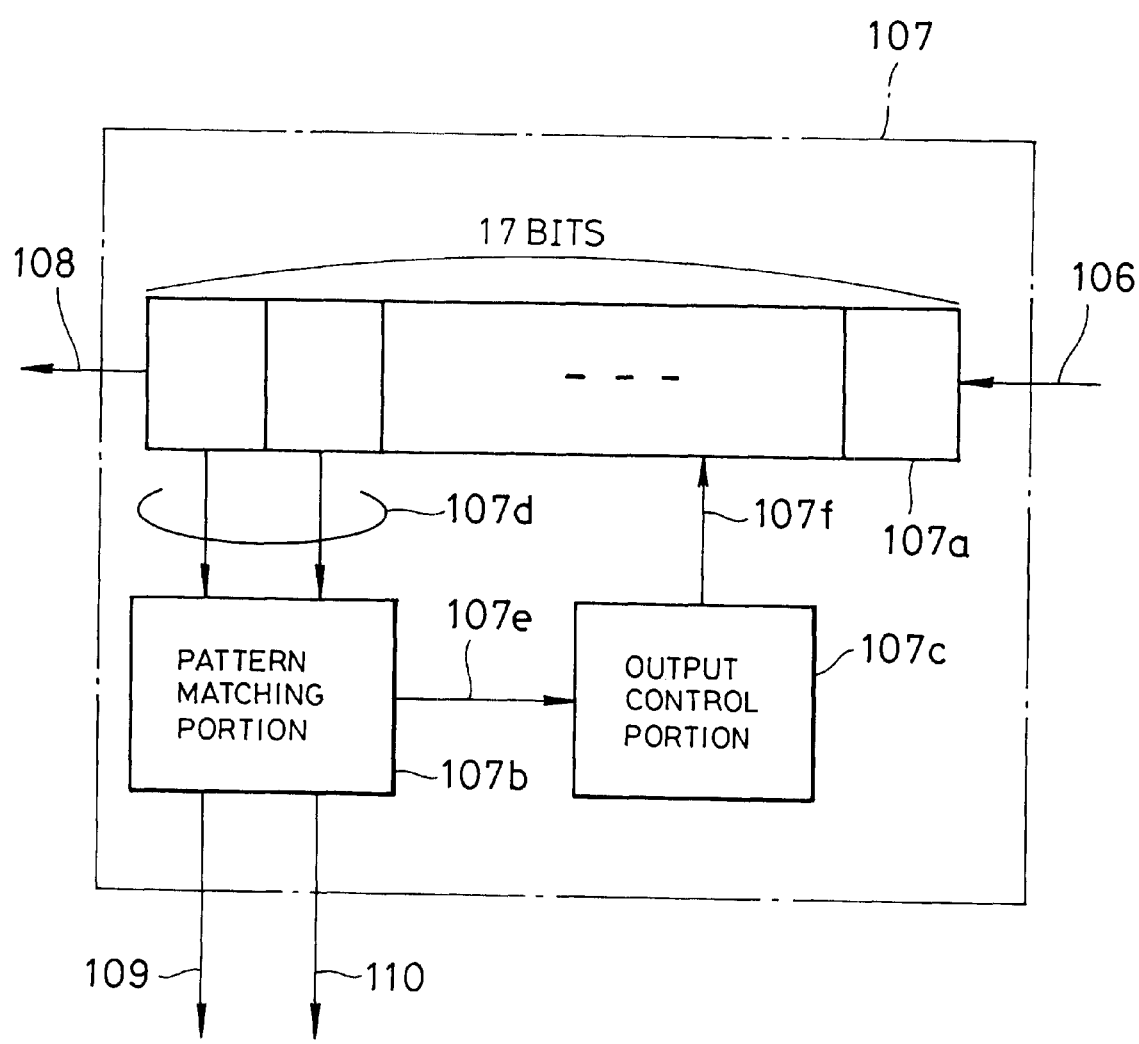
FIG. 4 is a block diagram showing an example of a construction of a table selecting unit in FIG. 1.

Furthermore, referring to FIG. 4, the table selecting unit 107 is constructed with a buffer 107a temporarily holding a 17-bit string, a pattern matching portion 107b matching between upper bits 107d of the bit string holded in the buffer 107a and a certain bit string pattern, and an output control portion 107c controlling output of the buffer 107a. The 17-bit string 106 is inputted into the buffer 107a. The buffer 107a outputs a bit string 108 based on a control signal 107f of the output control portion 107c.

The pattern matching portion 107b reads upper bits 107d of the bit string holded in the buffer 107a, and performs matching between the upper bits 107d and a certain bit string pattern. Then, the pattern matching portion 107b outputs signal 109 and 110 for selecting lookup table 114 or 115 and matching information 107e. The output control portion 107c outputs a signal 107f controlling output 108 of the buffer 107a based on the matching information 107e.

Figure 5:
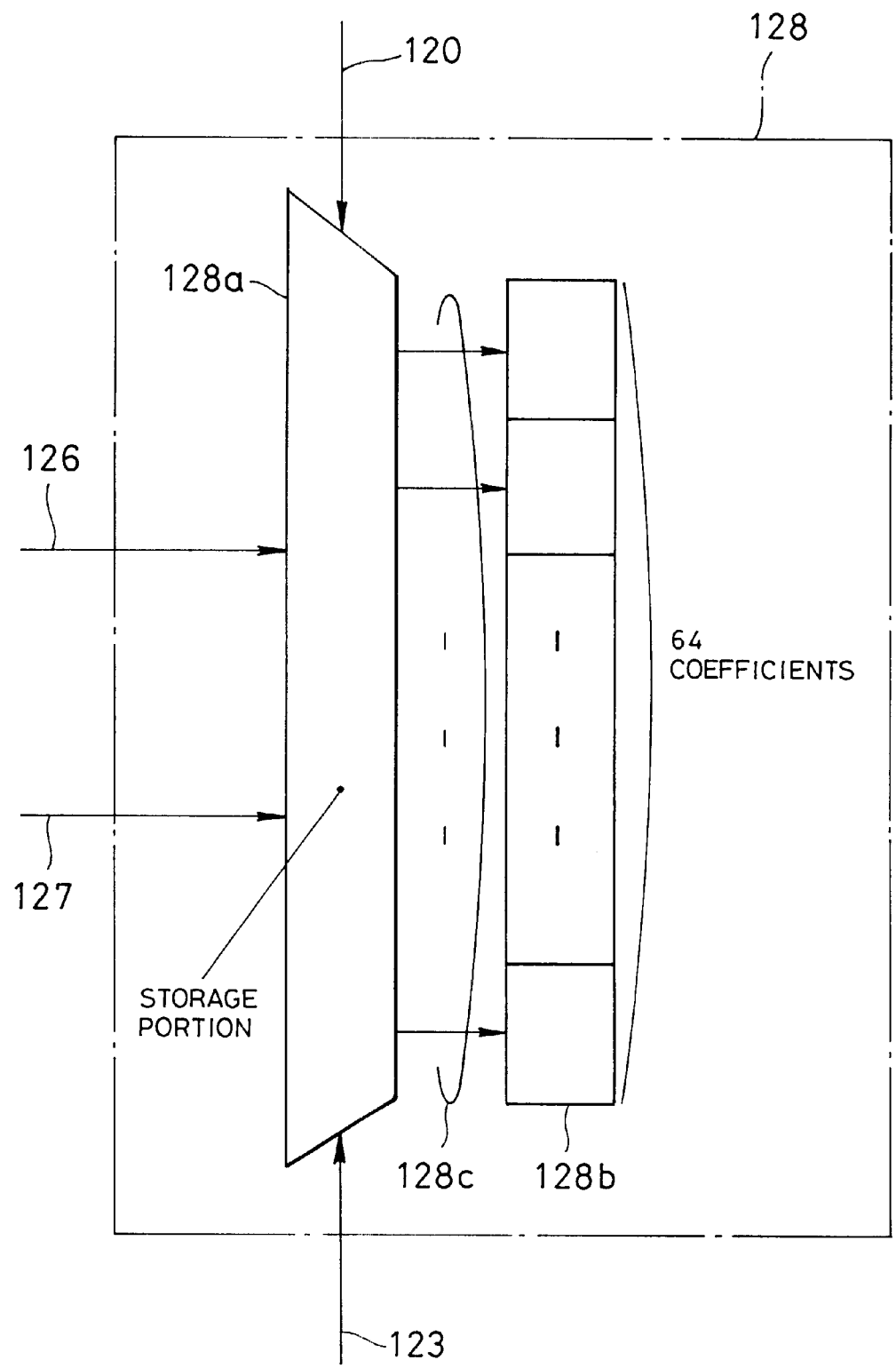
FIG. 5 is a block diagram showing an example of a construction of a DCT coefficient block storage unit in FIG. 1.

Referring to FIG. 5, the DCT coefficient block storage unit 128 is constructed with a storage portion 128a determining positions where the inverse quantization results 126 and 127 are stored based on the scanning order and the runs 120 and 123, and a DCT coefficient storage portion 128b where the inverse quantization results and stored. The runs 120 and 123 and the inverse quantization results 126 and 127 are inputted into the storage portion 128a. The storage portion 128a then outputs the inverse quantization results through appropriate two wires of output wiring group 128c. The DCT coefficient storage portion 128b has a storage region capable of storing sixty-four coefficients.

Here, construction of the lookup tables 114 and 115 will be discussed in detail.

At first, the lookup table 114 has an address expressed by seven bit binary value. In each address of the lookup table 114, when the address has a form where two codewords whose total length is less than or equal to seven are concatenated with a bit string whose length is greater than or equal to zero, two sets of {run, level} corresponding to two codewords and the total codeword length are stored in the table element corresponding to the address. On the other hand, in each address of the lookup table 114, except for the foregoing case, the address has a form where the codeword whose length is less than or equal to five are concatenated with a bit string whose length is greater than or equal to zero, {run, level} and the codeword length corresponding to the codeword are stored in the table element corresponding to the address. In each address of the lookup table 114, except for the foregoing two cases, arbitrary values are stored in the table element corresponding to the address.

On the other hand, the lookup table 115 has an address expressed by seventeen bit binary value. In each address of the lookup table 115, when the address has a form where the codeword whose length is greater than or equal to six is concatenated with a bit string whose length is greater than or equal to zero, {run, level} corresponding to the codeword and the codeword length are stored in the table element corresponding to the address. Otherwise, in each address of the lookup table 115, arbitrary values are stored in the table element corresponding to the address.

Next, discussion will be given for construction examples of the lookup tables 114 and 115 with reference to the drawings.

FIGS. 6 to 11 are illustrations showing Huffman code for DCT coefficient in MPEG standard. FIG. 6 is an illustration showing a decoded data and codeword length corresponding to a codeword whose length is greater than or equal to two and less than or equal to nine in the Huffman code table for DCT coefficients in MPEG standard, FIG. 7 is an illustration showing a decoded data and codeword length corresponding to a codeword whose length is eleven or thirteen in the Huffman code table for DCT coefficient in MPEG standard, FIG. 8 is an illustration showing a decoded data and codeword length corresponding to a codeword whose length is fourteen in the Huffman code table for DCT coefficient in MPEG standard, FIG. 9 is an illustration showing a decoded data and codeword length corresponding to a codeword whose length is fifteen in the Huffman code table for DCT coefficient in MPEG standard, FIG. 10 is an illustration showing a decoded data and codeword length corresponding to a codeword whose length is sixteen in the Huffman code table for DCT coefficient in MPEG standard, and FIG. 11 is an illustration showing a decoded data and codeword length corresponding to a codeword whose length is seventeen in the Huffman code table for DCT coefficient in MPEG standard.

In each table of the foregoing drawings, i.e. FIGS. 6 to 11, "codeword", "decoded data" corresponding to the "codeword", and "codeword length" are shown.

In the column of "codeword", respective codewords are shown. In the column of "decoded data", {run, level} corresponding to codewords shown in the column of "codeword" are shown. In the column of "codeword length", the lengths of codewords shown in the column of "codeword" are shown.

It should be noted that codewords "10" and "000001" are special. Namely, the codeword "10" represents EOB and the codeword "000001" represents a symbol "Escape" for expressing sets of run and level not defined in the Huffman table.

FIG. 12 is an illustration for explaining a construction of the lookup table 114, and FIGS. 13 to 19 are illustrations for explaining a construction of the lookup table 115.

FIG. 12 is an illustration showing a decoded data, a codeword length, a bit position matching codeword and a table address corresponding to two codewords whose total length is greater than or equal to five and less than or equal to seven, or one codeword whose length is greater than or equal to two and less than or equal to five in the lookup table 114 for parallel decoding in FIG. 1, FIG. 13 is an illustration showing a decoded data, a codeword length, a bit position matching codeword and a table address corresponding to one codeword whose length is greater than or equal to six and less than or equal to eight in the lookup table 115 for parallel decoding in FIG. 1, FIG. 14 is an illustration showing a decoded data, a codeword length, a bit position matching codeword and a table address corresponding to one codeword whose length is equal to nine or eleven in the lookup table 115 for parallel decoding in FIG. 1, FIG. 15 is an illustration showing a decoded data, a codeword length, a bit position matching codeword and a table address corresponding to one codeword whose length is thirteen in the lookup table 115 for parallel decoding in FIG. 1, FIG. 16 is an illustration showing a decoded data, a codeword length, a bit position matching codeword and a table address corresponding to one codeword whose length is fourteen in the lookup table 115 for parallel decoding in FIG. 1, FIG. 17 is an illustration showing a decoded data, a codeword length, a bit position matching codeword and a table address corresponding to one codeword who se length is fifteen in the lookup table 115 for parallel decoding in FIG. 1, FIG. 18 is an illustration showing a decoded data, a codeword length, a bit position matching codeword and a table address corresponding to one codeword whose length is sixteen in the lookup table 115 for parallel decoding in FIG. 1, and FIG. 19 is an illustration showing a decoded data, a codeword length, a bit position matching codeword and a table address corresponding the one codeword whose length is seventeen in the lookup table 115 for parallel decoding in FIG. 1.

At first, in FIG. 12, the "codeword", the "decoded data" corresponding to the "codeword", the "codeword length", a "bit position matching codeword" and "table address" are shown. With these items, the lookup table 114 is generated.

In the column of "codeword", concatenated two codewords, whose total codeword length is less than or equal to seven, or the codeword whose length is less than or equal to five are shown.

In the column of "bit position matching codeword", the 7-bit string where a bit string shown in the column of "code word" is concatenated with arbitrary bit string is shown. "?" represents that the corresponding bit is "1" or "0".

In the column of "decoded data", if the bit string shown in the column of "code word" is concatenation of two codewords, two sets of {run, level} corresponding to these codewords are shown. Otherwise, {run, Level} corresponding to one codeword is shown.

In the column of "codeword length", if the bit string shown in the column "codeword" is concatenation of two codewords, the total codeword length is shown. Otherwise, the length of one codeword is shown.

The column of "table address" is consisted of columns of "minimum value" and "maximum value". The column of "minimum value" has decimal values obtained by substituting "10" for all "?" in respective bit strings shown in "bit position matching codeword".

The column of "maximum value" has decimal values obtained by substituting "1" for all "?" in respective bit strings shown in "bit position matching code word".

Here, the lookup table 114 is constructed in the following manner.

At first, discussion will be given for the case where 7-bit addresses of the lookup table falls within a zone defined between "minimum value" and "maximum value" of FIG. 12. If the bit string shown in the column of "codeword" corresponding to the address is concatenation of two codewords, two sets of {run, level} in the column of "decoded data" and the total codeword length in the column of "codeword length" corresponding to the above zone are stored in the table element specified by the corresponding address. If the bit string-shown in the column of "codeword" corresponding to the address is a codeword, {run, level} in the column of "decoded data" and the codeword length in "codeword length" corresponding to the above zone are stored in the table element specified by the corresponding address.

In each 7-bit address of the lookup table 114, if the address does not fall in any zone, a dummy data is stored in the table element specified by the corresponding address. on the other hand, each table of FIGS. 13 to 19 consists of "codeword", "decoded data" corresponding to the "codeword", "codeword length", "bit position matching codeword" and "table address".

In the column of "codeword", the codewords whose lengths are greater than or equal to six are written. In the column of "bit position matching codeword", the 17-bit strings where bit strings shown in the column of "codeword" are concatenated with arbitrary bit string respectively are shown.

In the column of "decoded data", {run, level} corresponding to the codewords written in the column of "code word" are shown. In the column of "codeword length", lengths of codewords shown in the column of "codeword" are shown.

The column of "minimum value" of "table address" has decimal values obtained by substituting "0" for all "?" in respective bit strings shown in "bit position matching codeword". The column of "maximum value" of the "table address" has decimal values obtained by substituting "1" for all "?" in respective bit strings shown in "bit position matching codeword".

Here, the lookup table 115 is constructed in the following manner.

If 17-bit addresses of the lookup table 115 falls within a zone defined between "minimum value" and "maximum value" of FIGS. 13 to FIG. 19, {run, level} shown in the column of "decoded data" and the codeword length corresponding to the above zone are stored in the table element specified by the corresponding address. Otherwise, dummy data is stored in the table element specified by the corresponding address.

Next, operation of the shown embodiment of the signal decoding system will be discussed with reference to FIG. 1.

At first, the bit stream 101 of FIG. 1 is inputted into the left side of the buffer 102a and temporarily holded therein. The bit string buffer 102 outputs the 17-bit string 103 which is holded in the buffer 102b.

Subsequently, the bit string 105 in which decoded codewords are excluded from the bit string 103 is inputted in the bit string buffer 102. By controlling the switch group 102h, the bit string 105 is stored in the front portion of the buffer 102b. In addition, by controlling the switch group 102e, the front half portion 102d of the buffer 102a is stored in the end portion of the buffer 102b. It should be noted that the control portion 102c controls the length of the bit string 102d so that the total length of the two strings 102d and 105 becomes seventeen bit.

The bit string 103 is outputted as the bit string 106 in the table looking-up unit 104. The table selecting unit 107 selects one of two tables 114 and 115 based on the bit string 106.

More particularly, when the leading two bits of the 17-bit string 106 are "00", the lookup table 115 is selected. Then, in the pattern matching portion 107b, the control signals 109 and 110 are both set to "1". Otherwise, the lookup table 114 is selected. Then, in the pattern matching portion 107b the control signals 109 and 110 are both set to "0".

This is based on the fact that the 2-bit prefix of the bit position matching codeword shown in FIGS. 13 to 19, are all "00", and that the 2-bit prefix of the bit position matching codeword shown in FIG. 12, is "01", "10" or "11".

Furthermore, in the table selecting unit 107, when the lookup table 114 is selected, 7-bit prefix of the 17-bit string 106 is outputted as the table address 108. This is performed by shifting the buffer 107a toward 7-bit left, via the output control portion 107c, and the 10-bit rest is flushed. When the lookup table 115 is selected, the 17-bit string 106 is outputted as the table address 108. This is performed by shifting the buffer 107a toward 17-bit left via the output control portion 107c.

Now, the 17-bit output 106 of the table looking-up unit 104 is supposed to be "11111000000001110". Then, since the 2-bit prefix of "11111000000001110" is "11", the 7-bit prefix "1111100" in the bit string 106 is outputted as the table address 108 in table selecting unit 107, and both control signals 109 and 110 are set to "0".

In the selected lookup table 114, the table element is identified by table address 112 which is the output 108 of the table selecting unit 107. Then, the table element 119 is outputted. The table element 119 is outputted as two runs 120 and 123 being "0" respectively and levels 121 and 122 being "−1" and "1" respectively, via the demultiplexer 104c in the table looking-up unit 104. In the table looking-up unit 104, by using the total codeword length 104e "6", the bit string in which decoded codewords are excluded from the 17-bit string 103, namely 11-bit (=17−6(bit)) string "00000001110" following concatenated two codewords "111110" is outputted as the input 105 for the bit string buffer 102. This is done by shifting the buffer 104a toward left via the return bit selecting portion 104b based on the total codeword length 104e.

The level 121 "−1" is inversely quantized by the inverse quantizer 124 and the level 122 "1" is inversely quantized by the inverse quantizer 125, in parallel.

In the DCT coefficient block storage unit 128, the storage position is designated in the following manner. Namely, the storage portion 128a stores the inverse quantization result 126 at a position in the DCT coefficient storage portion 128b specified by the scanning order and the run 120 "0". On the other hand, the storage portion 128a stores the inverse quantization result 127 at a position identified by the scanning order and the run 123 "0".

As set forth above, in the shown embodiment of the signal deciding system, a variable-length decoding on maximum two codewords, is performed by only one table lookup operation. Besides, for the levels obtained by decoding, inverse quantization is performed in parallel. Furthermore, by neglecting inverse quantization for zero coefficients, the DCT coefficient block decoding can be speeded up.

The foregoing statement has been discussed with respect to a structure of two kinds of lookup tables. However, it should be clear that a construction including three or more kinds of lookup tables may be applied, on the other hand, two kinds of lookup tables which are different from the foregoing may be employed.

Furthermore, while the lookup table simultaneously decoding two code words has been discussed, it is clearly possible to employ the lookup table simultaneously decoding three or more codewords. In such case, since the memory capacity for achieving the lookup table becomes huge, attention has to be paid in selection of a memory IC to be used for the lookup table. As set forth above, by employing the lookup table simultaneously decoding maximum two code words, the signal decoding system can be constructed with the memory which has relatively small storage capacity. Such construction will be discussed later with reference to FIG. 23.

Figure 20:
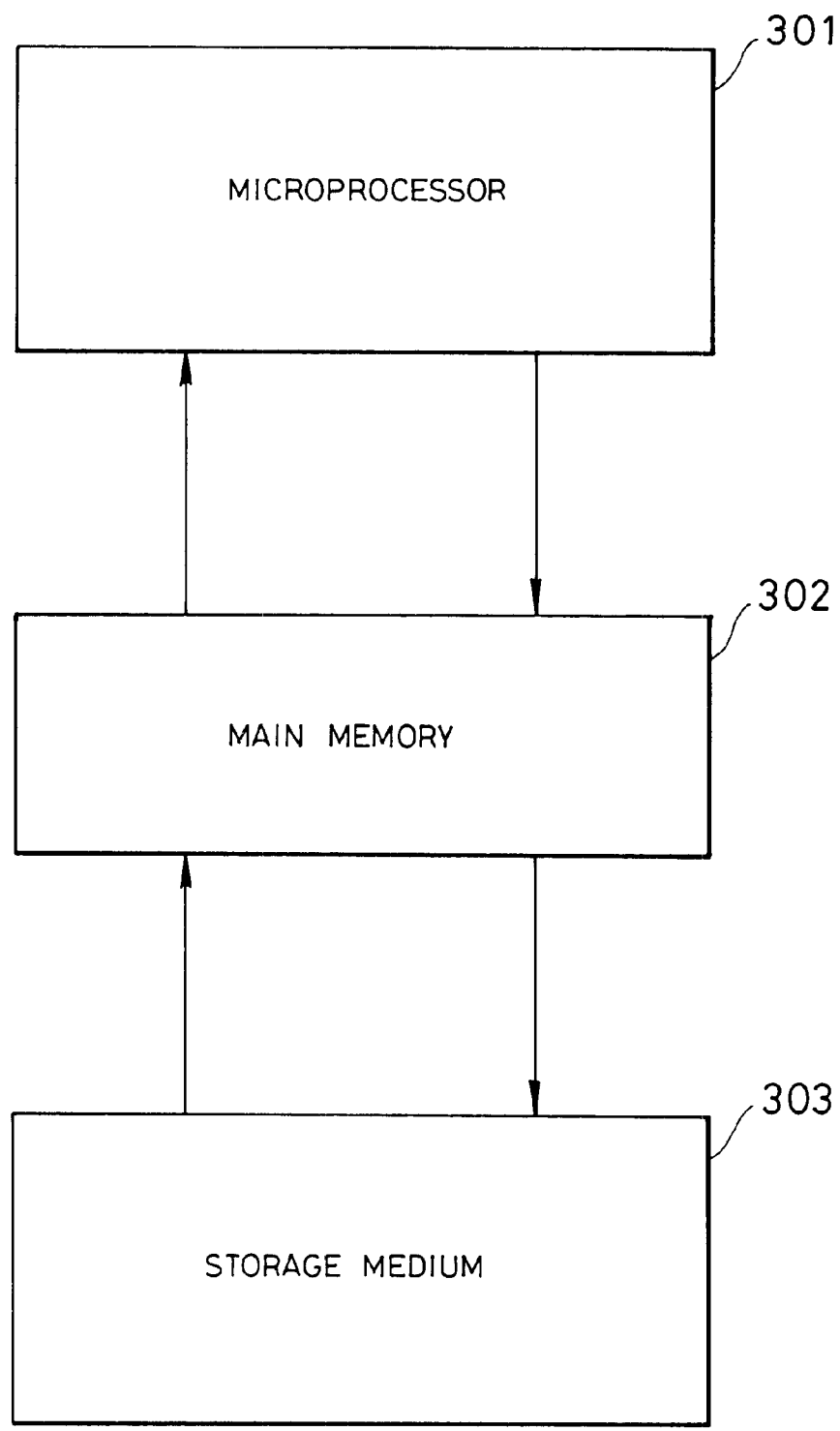
FIG. 20 is a block diagram showing a construction in the case of implementing the signal decoding system of the present invention by a software.

In the meanwhile, the DCT coefficient block decoding system shown in FIG. 1 can be all achieved by programs of a microprocessor. FIG. 20 shows such construction.

The DCT coefficient block decoding system in FIG. 1 is constructed with a storage medium 303 storing programs for performing a DCT coefficient block decoding, a main memory 302 for temporarily storing programs read out from the storage medium 303, and a microprocessor 301 executing the DCT coefficient block decoding under control by the programs. Then, as shown in FIG. 1, the bit string buffer 102, the table looking-up unit 104, the table selecting unit 107 and the lookup tables 114 and 115 can be easily implemented as programs of the microprocessor 301.

Figure 21:
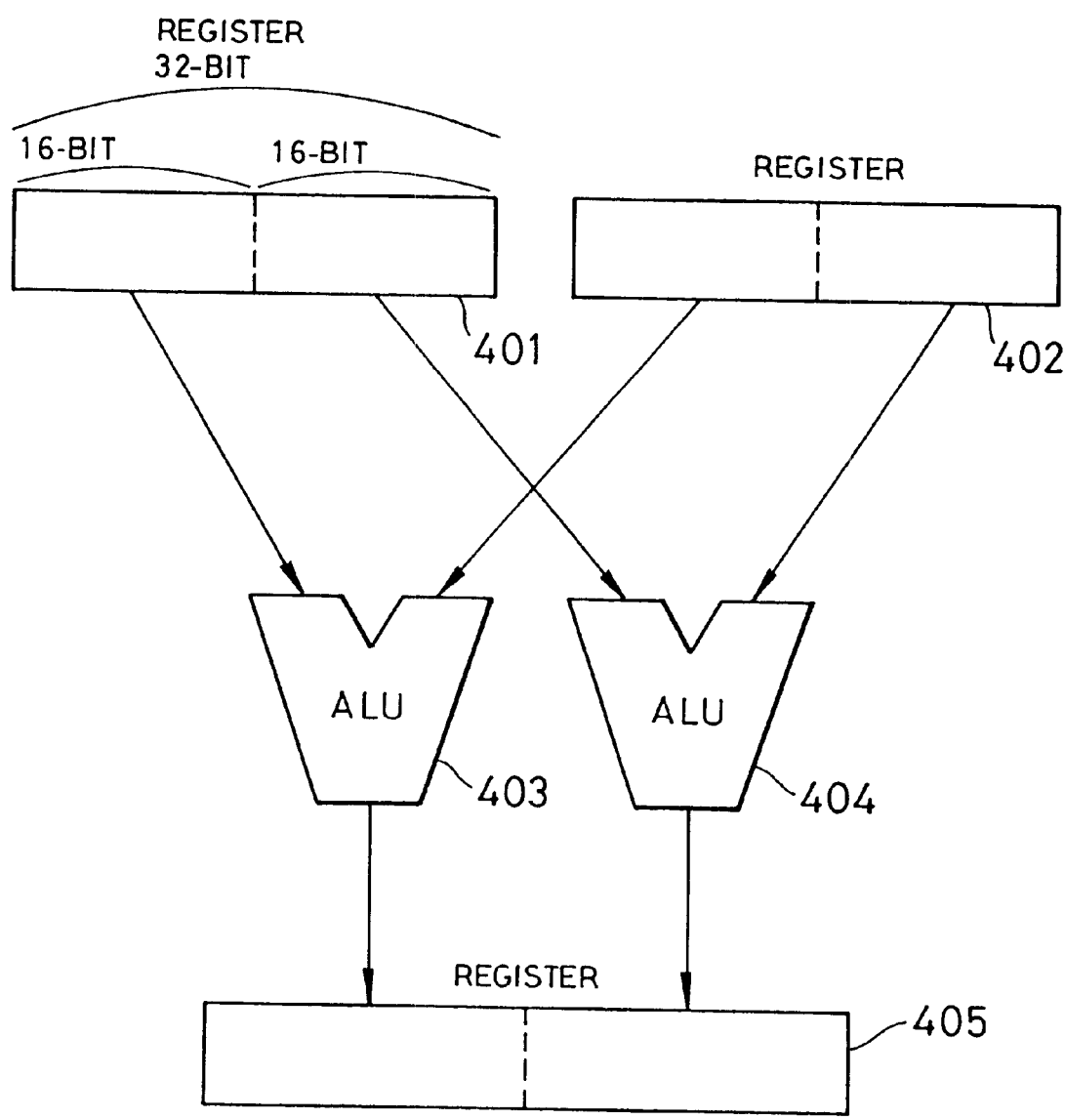
FIG. 21 is an illustration showing an arithmetic and logic unit which a microprocessor premised by the present invention will have.

Here, it has been premised that the microprocessor 301 has arithmetic and logic unit (ALU) as shown in FIG. 21.

In FIG. 21, there are 32-bit registers 401 and 402 which are divided into upper sixteen bits and lower sixteen bits, respectively. For upper sixteen bits of the registers 401 and 402, sixteen bit ALU 403 is provided. In addition, for lower sixteen bits of the registers 401 and 402, sixteen bit ALU 404 is provided.

The ALUs 403 and 404 may execute 16-bit addition, 16-bit subtraction and 16-bit multiplication. By operating two ALUs 403 and 404 in parallel, 16-bit arithmetic operation can be performed in parallel. Then, the result of the ALU 403 is stored in the upper sixteen bits of the register 405, and the result of the ALU 404 is stored in the lower sixteen bits of the register 405.

Thus, by using ALU 403 for achieving the inverse quantizer 124 and by using ALU 404 for achieving the inverse quantizer 125 by the ALU 404, the inverse quantization of the levels 121 and 122 can be executed in parallel.

On the other hand, the DCT coefficient clock storage unit 128 may also be easily implemented as the program of the microprocessor 301.

Figure 22:
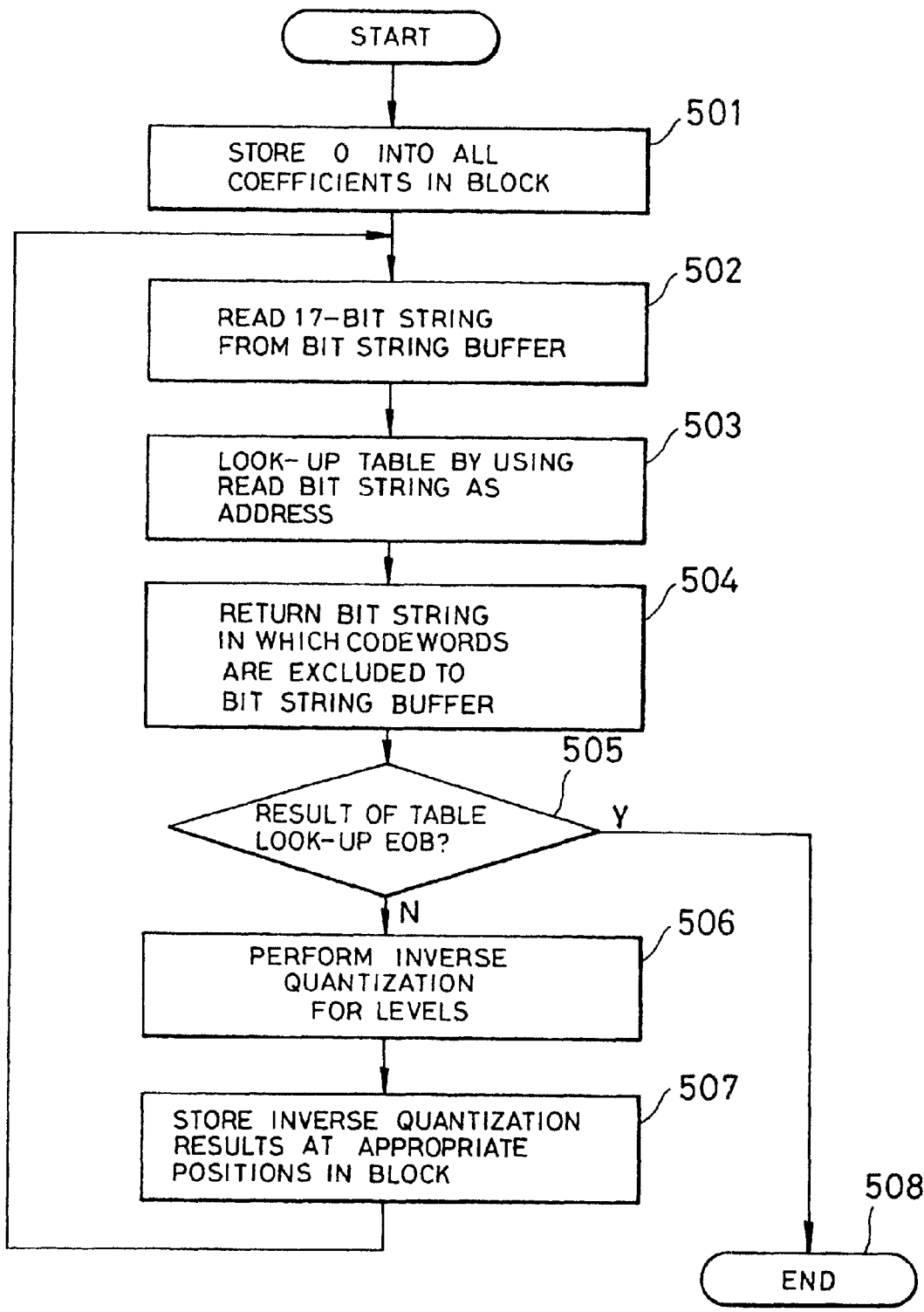
FIG. 22 is a flowchart showing a content of a program in the case where the signal decoding system based on the present invention is implemented by software.

Next, the content of the program stored in the storage medium 303 will be discussed with reference to FIG. 22. FIG. 22 is a flowchart showing a procedure of DCT coefficient block decoding for one block. At first, for all coefficients in the block 128b, "0" is stored (step 501). Then, the 17-bit string 103 is read from the bit string buffer 102 and is loaded in the register of the microprocessor 301 (step 502).

By using the read bit string 103 or a part thereof as an address, lookup tables 114 and 115 are looked up (step 503). By using the codeword length 104e obtained at step 503, the bit string 105 in which the decoded codewords are excluded from the string 103 is returned to the bit string buffer 102 (step 504). If the codeword decoded at step 503 indicates EOB, the DCT coefficient block decoding is terminated (steps 505 to 508). Otherwise, the next step 506 is executed (step 505).

Two or one levels 121 and 122 obtained at step 503 are inversely quantized (step 506). By using the scanning order and the runs 120 and 123 obtained at step 503, two or one inversely quantized values 126 and 127 obtained at step 506 are stored in the DCT coefficient block 128b (step 507).

Subsequently, the process of the steps 502 to 507 is repeated. Thus, one DCT coefficient block is decoded.

It should be noted that, in addition to a semiconductor memory, a magnetic disk device, various storage medium can be employed as the storage medium 303 set forth above.

Figure 23:
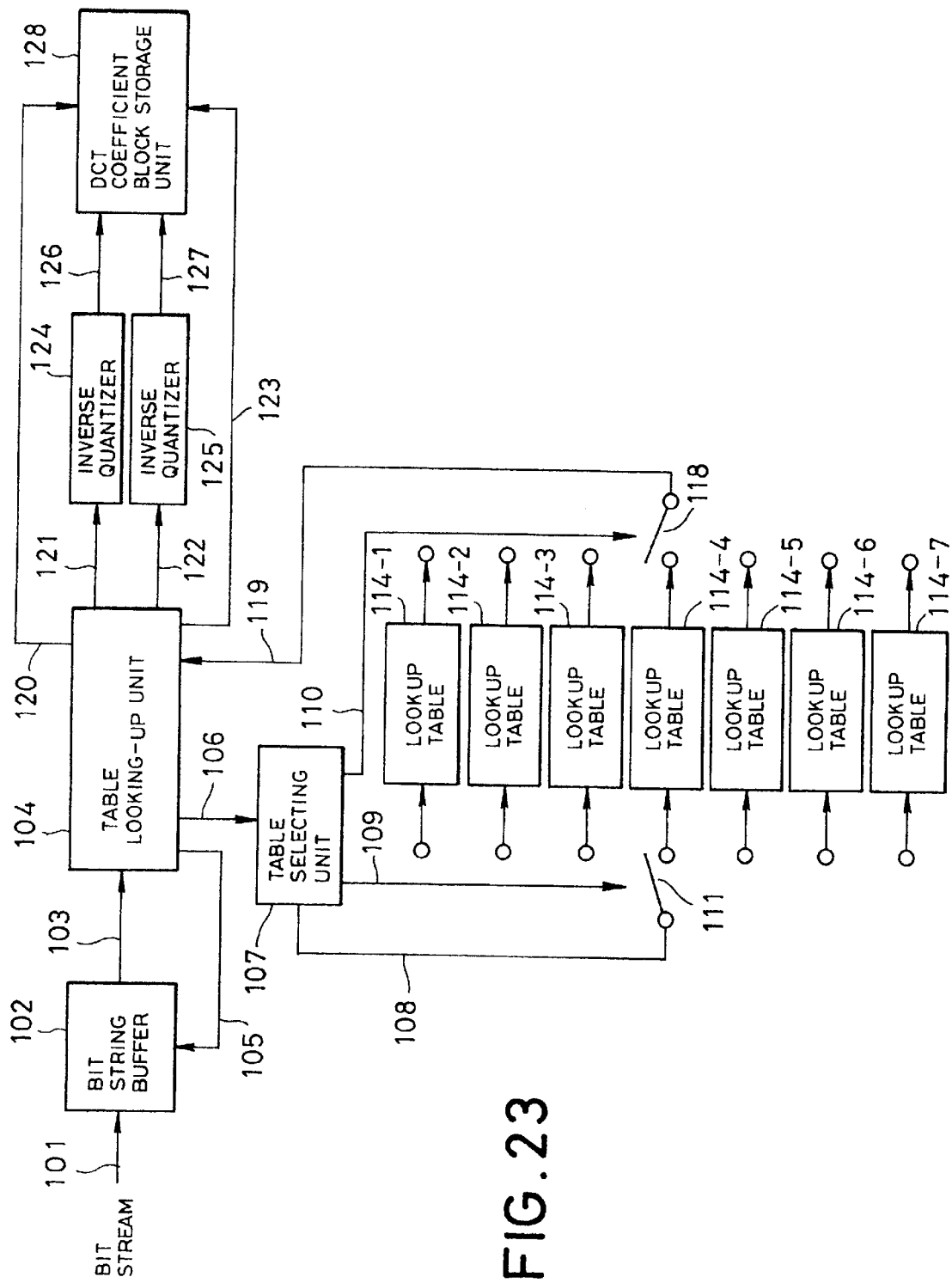
FIG. 23 is a block diagram showing a construction of another embodiment of the signal decoding system according to the present invention.

On the other hand, FIG. 23 is a block diagram showing another embodiment of the signal decoding system according to the present invention. In the following discussion, the same elements as those in the foregoing embodiment will be identified by the same reference numerals and detailed discussion therefor will be neglected for avoiding redundant discussion to keep the disclosure simple enough to facilitate clear understanding of the present invention.

In FIG. 23, the shown embodiment of the signal decoding system according to the present invention is different from the image signal decoding system of FIG. 1 in that seven lookup tables 114-1 to 114-7 are provided. The lookup table 114-1 is a table whose elements have two or one sets of run and level corresponding two or one codewords and the total codeword length, as well as that of the former embodiment of FIG. 1. The lookup tables 114-2 to 114-7 are tables whose elements have a set of run and level corresponding to one codeword and the codeword length, as well as those of the former embodiment of FIG. 1. These lookup tables have the table address 108 as the input and output a table element 119 identified by the address. It should be noted that other portions shown in FIG. 23 operate as those of FIG. 1.

Here, detailed discussion will be given with respect to the construction of the lookup table 114-1 to 114-7.

At first, the lookup table 114-1 is looked up by using the address expressed by nine bit binary value. In each address of lookup table 114-1, if the address is a 9-bit string where two codewords are concatenated with a bit string whose length is greater than or equal to zero, two sets of {runs, levels} corresponding to two codewords and the total codeword length are stored in the table element identified by the address. On the other hand, in each address of the lookup table 114-1, except for foregoing, if the address is a 9-bit string where a codeword is concatenated with a bit string whose length is greater than or equal to zero, {run, level} corresponding to the codeword and the codeword length are stored in the table element identified by the address. In each address of the decoding reference table 114-1, except for foregoing two cases, arbitrary value is stored in the table element identified by the address. The lookup table 114-1 corresponds to FIG. 6 set forth above.

The lookup table 114-2 is looked up by using the address expressed by 11-bit binary value. If the address equals a 11-bit codeword, {run, level} corresponding to the codeword and the codeword length are stored in the table element identified by the address. Otherwise, in each address of the lookup table 114-2, arbitrary value is stored in the table element identified by the address. The lookup table 114-2 corresponds to a part of FIG. 7 set forth above.

The lookup table 114-3 is looked up by using the address expressed by 13-bit binary value. If the address equals a 13-bit codeword, {run, level} corresponding to the codeword and the codeword length are stored in the table element identified by the address. Otherwise, in each address of the lookup table 114-3, arbitrary value is stored in the table element identified by the address. The lookup table 114-3 corresponds to a part of FIG. 7 set forth above.

The lookup table 114-4 is looked up to by using the address expressed by 14-bit binary value. If the address equals a 14-bit codeword, {run, level} corresponding to the codeword and the codeword length are stored in the table element identified by the address. Otherwise, in each address of the lookup table 114-4, arbitrary value is stored in the table element identified by the address. The lookup table 114-4 corresponds to FIG. 8 set forth above.

The lookup table 114-5 is looked up by using the address expressed by 15-bit binary value. If the address equals a 15-bit codeword, {run, level} corresponding to the codeword and the codeword length are stored in the table element identified by the address. Otherwise, in each address of the lookup table 114-5, arbitrary value is stored in the table element identified by the address. The lookup table 114-5 corresponds to FIG. 9 set forth above.

The lookup table 114-6 is looked up by using the address expressed by 16-bit binary value. If the address equals a 16-bit codeword, {run, level} corresponding to the codeword and the codeword length are stored in the table element identified by the address. Otherwise, in each address of the lookup table 114-6, arbitrary value is stored in the table element identified by the address. The lookup table 114-6 corresponds to FIG. 10 set forth above.

The lookup table 114-7 is looked up by using the address expressed by 17-bit binary value. If the address equals a 17-bit codeword, {run, level} corresponding to the codeword and the codeword length are stored in the table element identified by the address. Otherwise, in each address of the lookup table 114-7, arbitrary value is stored in the table element identified by the address. The lookup table 114-7 corresponds to FIG. 11 set forth above.

FIGS. 24 to 26 consist of "codeword", "decoded data" corresponding to "codeword", "codeword length", "bit position matching codeword" and "table address". In the "codeword" of FIG. 24, among two codewords which can be decoded simultaneously by the lookup table 114-1, concatenated two codewords whose total length is less than or equal to eight are shown. In the "codeword" of FIG. 25, among two codewords which can be decoded simultaneously by the lookup table 114-1, concatenated two codewords whose total length is nine are shown. In the "codeword" of FIG. 26, one codeword which can be decoded by the lookup table 114-1, whose length is greater than or equal to two and less than or equal to nine, is shown.

In the column of "bit position matching codeword" FIG. 24 to 26, the 9-bit string where each bit string shown in the column of "codeword" is concatenated with arbitrary bit string. "?" represents "1" or "0". In the column of "decoded data" of FIG. 24 to 26, when the bit string shown in the column of "codeword" consists of concatenated two codewords, two sets of {run, level} corresponding to the two codewords are written. Otherwise, {run, level} corresponding to one code word shown in the column of "codeword" is written. In the column of "codeword length" of FIG. 24 to 26, when the bit string shown in the column of "codeword" consists of concatenated two codewords, the total codeword length is written. Otherwise, the length of one codeword in the column of "codeword" is written.

In FIGS. 24 to 26, the column of "table address" consists of "minimum value" and "maximum value". In the column of "minimum value", the decimal value in which all "?" s of each bit string shown in the column of "bit position matching code word" are set to "0" is written. In the column of "maximum value", the decimal value in which all "?"s of each bit string shown in the column of "bit position matching codeword" are set to "1" is written. Here, the lookup table 114-1 is constructed in the following manner.

At first, discussion will be given for the case where each 9-bit address in the lookup table 114-1 falls within a zone between the "minimum value" and the "maximum value". If the bit string shown in the column of "codeword" corresponding to the zone consists of concatenated two codewords, two sets of {run, level} corresponding to the two codewords in the column of "decoded data" and the total codeword length are stored in the table element of the corresponding address. Otherwise, {run, level} in the column of "decoded data" and the codeword length corresponding to the zone are stored in the table element of the corresponding address.

On the other hand, in each 9-bit address of the lookup table 114-1, when the address does not fall within any zone between the "minimum value" and the "maximum value", of FIGS. 24 to 26, the dummy data is stored in the table element of the corresponding address. The lookup table 114-1 has 9the power of 2, i.e. 512 table elements, since the address length is 9-bit.

FIG. 27 is an illustration for explaining the structure example of the lookup table 114-2. In FIG. 27 for one codeword which can be decoded by the lookup table 114-2, "codeword", "decoded data" corresponding to "codeword", "codeword length" and "table address" are shown. In the column of "codeword", 11-bit codeword is written. In the column of "decoded data", {run, level} corresponding to the codeword shown in the column of "codeword" is written. In the column of "codeword length", cordword length 11 is written. In the column of "table address", a value derived by converting the bit string shown in the column of "codeword" into the decimal value is written.

The lookup table 114-2 is constructed as follows. In each 11-bit address of the lookup table 114-2, when the address equals a value shown in the column of "table address", {run, level} in the column of "decoded data" corresponding to the value and the codeword length are stored in the table element of the corresponding address.

Otherwise, in each 11-bit address of the lookup table 114-2, the dummy data is stored in the table element of the corresponding address. Since the address length of the lookup table 114-2 is eleven bit, the number of table elements is (11)th power of 2 (=2048). However, in practice, since the six bit prefix of the codeword consists of all "0", the maximum value of the address is 31, and a memory region capable of storing 32 table elements is just needed.

FIG. 28 is an illustration for explaining the structure example of the lookup table 114-3. In FIG. 28, for one codeword which can be decoded by the lookup table 114-3, "codeword", "decoded data" corresponding to "codeword", "codeword length" and "table address" are shown. In the column of "codeword", the 13-bit codeword is written. In the column of "decoded data", {run, level} corresponding to the codeword shown in the column of "codeword" is written. In the column of "codeword length", codeword length 13 is written. In the column of "table address", a value derived by converting the codeword into the decimal value is written.

The lookup table 114-3 is constructed as follows. In each 13-bit address of the lookup table 114-3, when the address equals a value shown in the column of "table address" in FIG. 28, {run, level} in the column of "decoded data" corresponding to the value and the codeword length are stored in the table element of the corresponding address.

Otherwise, in each 13-bit address of the lookup table 114-3, the dummy data is stored in the table element of the corresponding address. Since the address of the lookup table 114-3 is thirteen bit, the number of table elements is (13)th power of 2 (=8192). However, in practice, since the 7-bit prefix of the codeword consists of all "0", the maximum value of the address is 63, and a memory region capable of storing 64 table elements is just needed.

FIG. 29 is an illustration for explaining the structure example of the lookup table 114-4. In FIG. 29, for one codeword which can be decoded by the lookup table 114-4, "codeword", "decoded data" corresponding to "codeword", "codeword length" and "table address" are shown. In the column of "codeword", the 14-bit codeword is written. In the column of "decoded data", {run, level} corresponding to the codeword shown in the column of "codeword" is written. In the column of "codeword length", cordword length 14 is written. In the column of "table address", a value derived by converting the codeword into the decimal value is written.

The lookup table 114-4 is constructed as follows. In each 14-bit address of the lookup table 114-4, when the address equals a value shown in the column of "table address" in FIG. 29, {run, level} in the column of "decoded data" corresponding to the value and the codeword length are stored in the table element of the corresponding address.

Otherwise, in each 14-bit address of the lookup table 114-4, the dummy data is stored in the table element of the corresponding address. Since the address of the lookup table 114-4 is fourteen bit, the number of table elements is (14)th power of 2 (=16384). However, in practice, since the 8-bit prefix of the codeword consists of all "0", the maximum value of the address is 63, and a memory region capable of storing 64 able elements is just needed.

FIG. 30 is an illustration for explaining the structure example of the lookup table 114-5. In FIG. 30, for one codeword which can be decoded by the lookup table 114-5, "codeword", "decoded data" corresponding to "codeword", "codeword length" and "table address" are shown. In the column of "codeword", the 15-bit codeword is written. In the column of "decoded data", {run, level} corresponding to the codeword shown in the column of "codeword" is written. In the column of "codeword length", cordword length 15 is written. In the column of "table address", a value derived by converting the codeword into the decimal value is written.

The lookup table 114-5 is constructed as follows. In each 15-bit address of the lookup table 114-5, when the address equals a value shown in the column of "table address" in FIG. 30, {run, level} in the column of "decoded data" corresponding to the value and the codeword length are stored in the table element of the corresponding address.

Otherwise, in each 15-bit address of the lookup table 114-5, the dummy data is stored in the table element of the corresponding address. Since the address of the lookup table 114-5 is fifteen bit, the number of table elements is (15)th power of 2 (=32768). However, in practice, since the 9-bit prefix of the codeword consists of all "0", the maximum value of the address is 63, and a memory region capable of storing 64 table elements is just needed.

FIG. 31 is an illustration for explaining the structure example of the lookup table 114-6. In FIG. 31, for one codeword which can be decoded by the lookup table 114-6, "codeword", "decoded data", corresponding to "codeword", "codeword length" and "table address" are shown. In the column of "codeword", the 16-bit codeword is written. In the column of "decoded data", {run, level} corresponding to the codeword shown in the column of "codeword" is written. In the column of "codeword length", cordword length 16is written. In the column of "table address", a value derived by converting the codeword into the decimal value is written.

The lookup table 114-6 is constructed as follows. In each 16-bit address of the lookup table 114-6, when the address equals a value shown in the column of "table address" in FIG. 31, {run, level} in the column of "decoded data" corresponding to the value and the codeword length are stored in the table element of the corresponding address.

Otherwise, in each 16-bit address of the lookup table 114-6, the dummy data is stored in the table element of the corresponding address. Since the address of the lookup table 114-6 is sixteen bit, the number of table elements is (16)th power of 2 (=65536). However, in practice, since the 10-bit prefix of the codeword consists of all "0", the maximum value of the address is 63, and a memory region capable of storing 64 table elements is just needed.

FIG. 32 is an illustration for explaining the structure example of the lookup table 114-7. In FIG. 32, for one codeword which can be decoded by the lookup table 114-7, "codeword", "decoded data" corresponding to "codeword", "codeword length" and "table address" are shown. In the column of "codeword", the 17-bit codeword is written. In the column of "decoded data", {run, level} corresponding to the codeword shown in the column of "codeword" is written. In the column of "codeword length", codeword length 17 is written. In the column of "table address", a value derived by converting the codeword into the decimal value is written.

The lookup table 114-7 is constructed as follows. In each 17-bit address of the lookup table 114-7, when the address equals a value shown in the column of "table address" in FIG. 32, {run, level} in the column of "decoded data" corresponding to the value and the codeword length are stored in the table element of the corresponding address.

Otherwise, in each 17-bit address of the lookup table 114-7, the dummy data is stored in the table element of the corresponding address. Since the address of the lookup table 114-7 is seventeen bit, the number of table elements is (17)th power of 2 (=131072). However, in practice, since the 11-bit prefix of the codeword consists of all "0", the maximum value of the address is 63, and a memory region capable of storing 64 table elements is just needed.

By constructing the lookup tables as set forth above, the total number of the table elements becomes 864. Therefore, compared with the number of table elements ((17)th power of 2 (=131072)) in the conventional method, the number of table elements can be reduced significantly.

Figure 33:
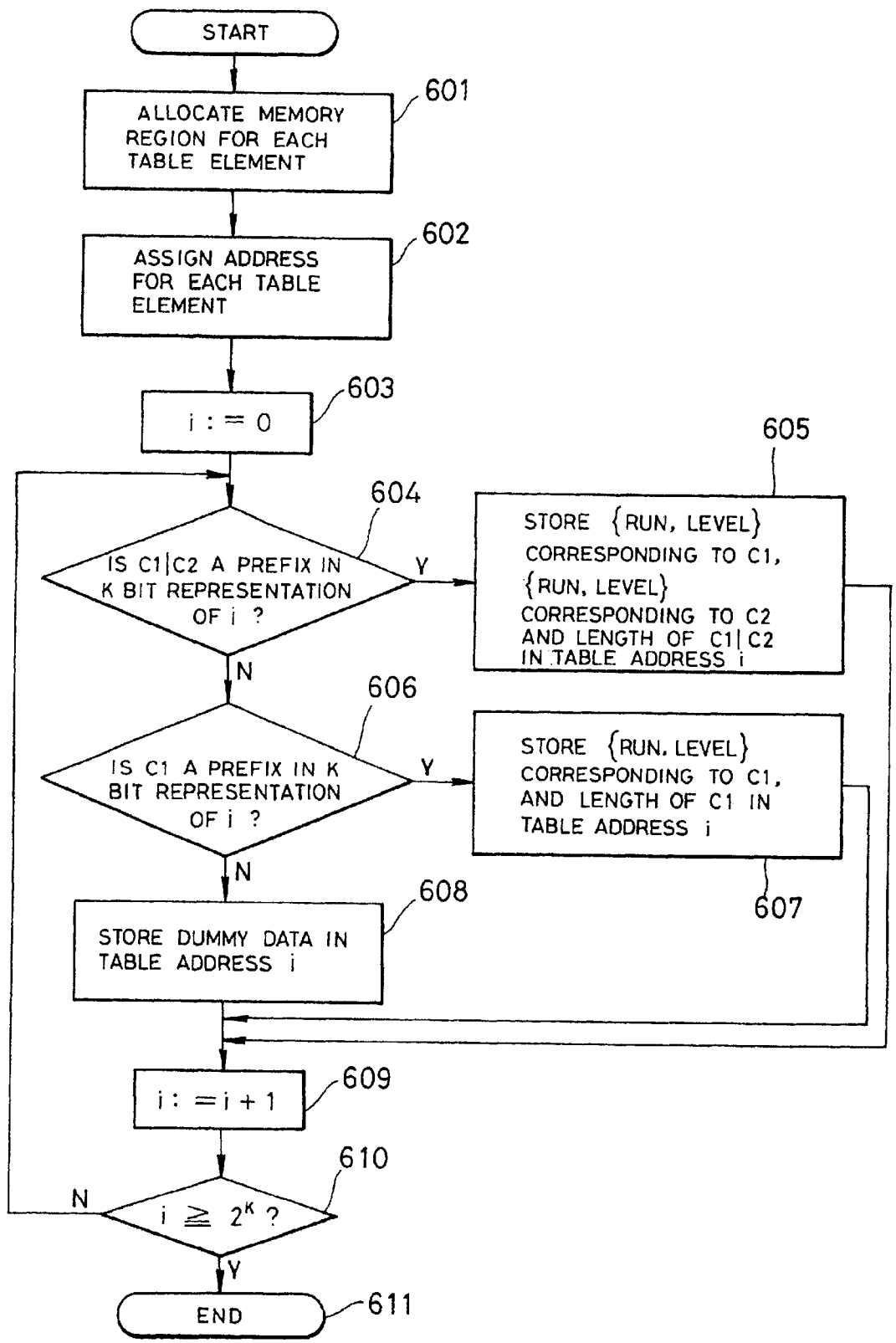
FIG. 33 is a flowchart showing a generation method of the lookup table for parallel decoding in FIG. 23.
Figure 34:
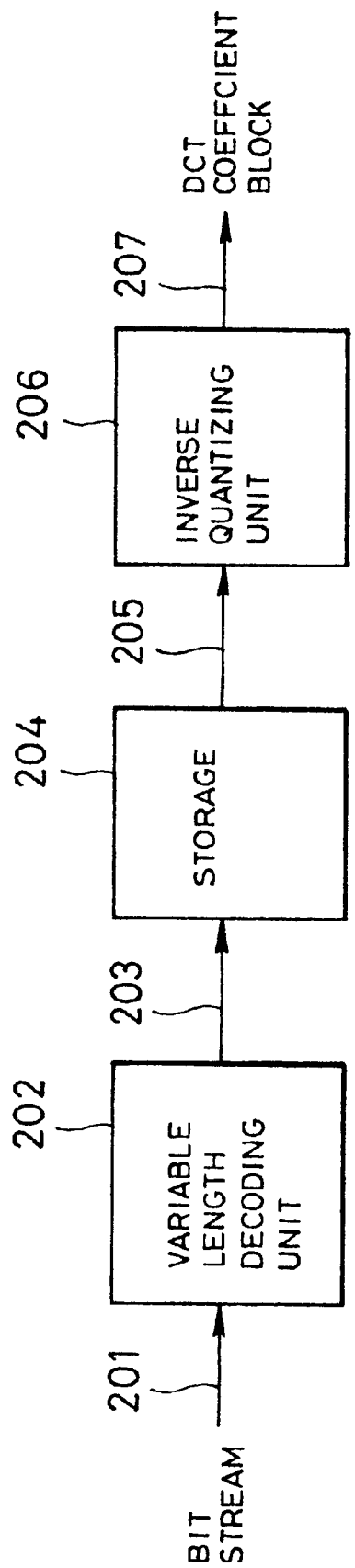
FIG. 34 is a block diagram showing a construction and operation of the conventional signal decoding system.
Figure 35:
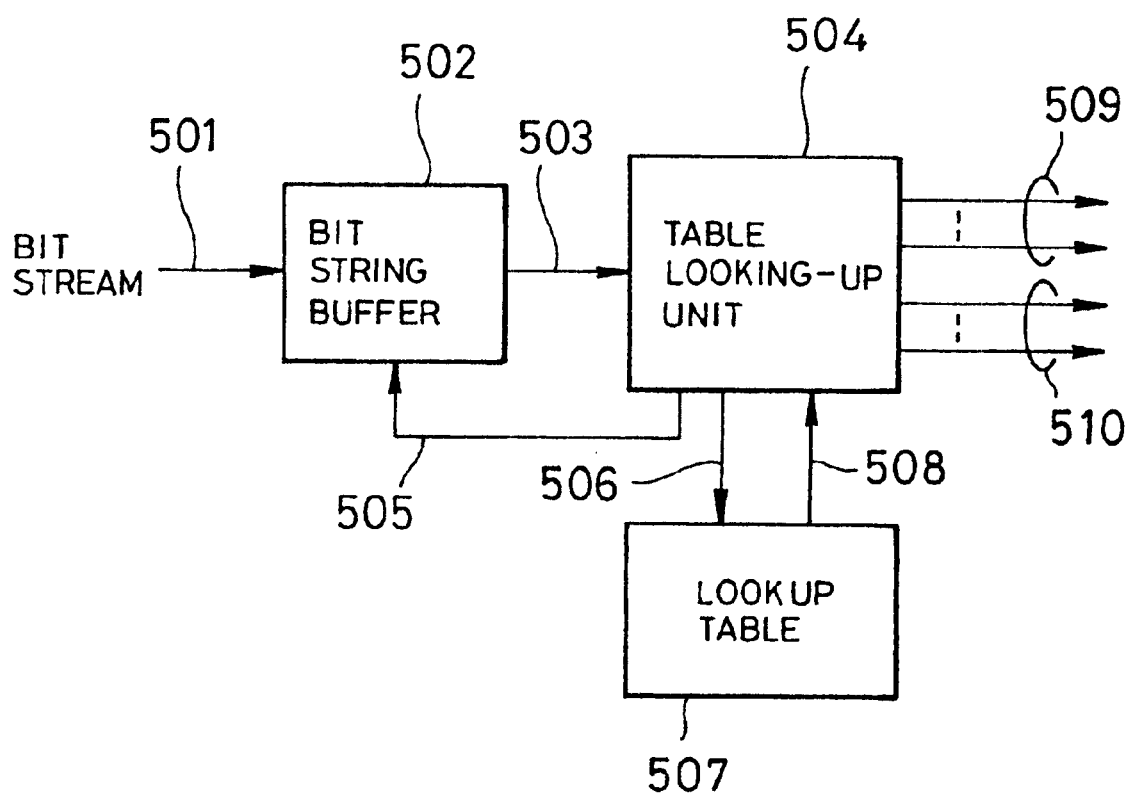
FIG. 35 is a block diagram showing a construction and operation of another conventional signal decoding system.

Here, a method constructing the lookup tables 114-1 to 114-7 in FIG. 23 will be discussed with reference to FIG. 33. FIG. 33 is a flowchart showing a procedure in constructing the lookup table 114-1 with K-bit address. In the lookup table, the number of the table elements is assumed to be $2^K$, where K is less than 17.

A memory region for each table element in the lookup table 114-1 is allocated (step 601). Then, the addresses i (i is an integer greater than or equal to 0 and less than $2^K$) are assigned to each table element (step 602).

Next, i is set to zero (step 603). At step 604, when a prefix in the K bit representation of the address i equals concatenation C1|C2 of codewords C1 and C2, {run, level} corresponding to the codeword C1 and {run, level} corresponding to the codeword C2 and the bit length of C1|C2 are stored in the table element of address i (step 605), and step 609 is executed. Otherwise, step 606 is executed.

At step 606, when a prefix in the K bit representation of the address i equals the codeword C1, {run, level} corresponding to the codeword C1 and the length of C1 are stored in the table element of the address i (step 607), and step 609 is executed. Otherwise, step 608 is executed.

At step 608, the dummy data is stored in the table element of the address i. At step 609, the address i is incremented by one. Subsequently, if i is greater than or equal to $2^K$, construction of the decoding reference table 114-1 is terminated (steps 610 to 611). Otherwise, step 604 is executed.

It should be noted that the lookup table 114-1 shown in FIGS. 24 to 26 as set forth above is for the case where K=9, namely the address length is nine bit. According to the flowchart shown in FIG. 33, the program is generated. Then, it is clear that, by using this program, the computer is controlled to generate the lookup table 114-1. Semiconductor memory, magnetic disk device and so forth, can be used as the storage medium for storing such programs.

A method constructing the lookup tables set forth above, has been disclosed by the inventors, Daiji Ishii et al, in "PARALLEL VARIABLE LENGTH DECODING WITH INVERSE QUANTIZATION FOR SOFTWARE MPEG-2 DECODERS", 1997, IEEE WORKSHOP ON SIGNAL PROCESSING SYSTEM SiPS 97 Design and implementation, pp 500 to 509.

The operation of the shown embodiment on the signal decoding system will be discussed with reference to FIG. 23. At first, the bit stream 101 is inputted into the buffer 102a of the bit string buffer 102. The bit string buffer 102 outputs the 17-bit string 103 stored in the buffer 102b.

Thereafter, the bit string 105 in which the decoded codeword is excluded from the bit string 103 is inputted into the buffer 102. Through control of the switch group 102h by the control portion 102c, the bit string 105 is stored in the front part of the buffer 102b. In addition, through control of the switch group 102e by the control portion 102c, the front part 102d of the buffer 102a is stored in the end part of the buffer 102b. It should be appreciated that the control portion 102c controls the length of the string 102d outputted from the buffer 102a so that the total length with the bit string 105 becomes seventeen bit.

The inputted string 103 is outputed as the bit string 106 from the table looking-up unit 104. The table selecting unit 107 stores the inputted string 106 in the buffer 107a, and selects one of the seven kinds of lookup tables 114-1 to 114-7 based on the bit string held in the buffer 107a.

Hereinafter, the operation of the table selecting unit 107 will be discusses more particularly.

When a prefix in the bit string held in the buffer 107a matches with one of "1", "01", "001", "0001", "00001" and "000001", the lookup table 114-1 is selected. This is based on the fact that the prefixes of the codewords illustrated in FIGS. 24 to 26 are one of "1", "01", "001", "0001", "00001" and "000001". Table selection is performed by connecting the switches 111 and 118 to the lookup table 114-1 through the control signals 109 and 110.

Besides, the table selecting unit 107 outputs nine bit prefix in the bit string held in the buffer 107a, and flushes (erases) the remained bit string. When a prefix in the bit string held in the buffer 107a matches with the pattern "0000001", the lookup table 114-2 is selected. This is based on the fact that the prefixes of all codewords shown in FIG. 27 are "0000001". Table selection is performed by connecting the switches 111 and 118 to the lookup table 114-2 through the control signals 109 and 110.

Besides, the table selecting unit 107 outputs eleven bit prefix in the bit string held in the buffer 107a, and flushes the remained bit string. When a prefix in the bit string held in the buffer 107a matches with the pattern "00000001", the lookup table 114-3 is selected. This is based on the fact that the prefixes all codewords shown in FIG. 28 are "00000001". Table selection is performed by connecting the switches 111 and 118 to the lookup table 114-3 through the control signals 109 and 110.

Besides, the table selecting unit 107 outputs thirteen bit prefix in the bit string held in the buffer 107a, and flushes the remained bit string. When a prefix in the bit string held in the buffer 107a matches with the pattern "000000001", the lookup table 114-4 is selected. This is based on the fact that he prefixes of all codewords shown in FIG. 29 are "000000001". Table selection is performed by connecting the switches 111 and 118 to the lookup table 114-4 through the control signals 109 and 110.

Besides, the table selecting unit 107 outputs fourteen bit prefix in the bit string held in the buffer 107a, and flushes the remained bit string. When a prefix in the bit string held in the buffer 107a matches with the pattern "0000000001", the lookup table 114-5 is selected. This is based on the fact that the prefixes of all codewords shown in FIG. 30 are "0000000001". Table selection is performed by connecting the switches 111 and 118 to the lookup table 114-5 through the control signals 109 and 110.

Besides, the table selecting unit 107 outputs fifteen bit prefix in the bit string held in the buffer 107a and flushes the remained bit string. When a prefix in the bit string held in the buffer 107a matches with the pattern "00000000001", the lookup table 114-6 is selected. This is based on the fact that the prefixes of all codewords shown in FIG. 31 are "00000000001". Table selection is performed by connecting the switches 111 and 118 to the lookup table 114-6 through the control signals 109 and 110.

Besides, the table selecting unit 107 outputs sixteen bit prefix in the bit string held in the buffer 107a and flushes the remained bit string. When a prefix in the bit string held in the buffer 107a matches with the pattern "000000000001", the lookup table 114-7 is selected. This is based on the fact that the prefixes of all codewords shown in FIG. 32 are "0000000000001". Table selection is performed by connecting the switches 111 and 118 to the lookup table 114-7 through the control signals 109 and 110.

Besides, the table selecting means 107 outputs the seventeen bit string held in the buffer 107a.

Now, it is supposed that the 17-bit strings 103 and 106 are "11111000000001110". Since the 1-bit prefix of the bit string "11111000000001110" is "1", the 9-bit prefix "111110000" in the 17-bit string 106 is outputted as the table address 108. Then, by the control signals 109 and 110, the switches 111 and 118 are connected to the lookup table 114-1. In the selected lookup table 114-1, the table address 108 which is the output of the table selecting unit 107 identifies a table element 119. Thus, the table element 119 is outputted. The obtained table element 120 is outputted as runs 120 "0" and 123 "0" and levels 121 "−1" and 122 "1" through the demultiplexer 104c of the table looking-up unit 104. In the table looking-up unit 104, by using the total codeword length 104e "6", the bit string in which the decoded codewords are excluded from the 17-bit string, namely the 11(=17−6)-bit string "00000001110" following "111110" which is concatenated two codewords is outputted to the bit string buffer 102. This is performed by shifting the buffer 104a toward left based on the total codeword length 104e of the return bit selecting portion 104b. Among the levels 121 "−1" and 122 "1", level 121 is inversely quantized by the inverse quantizer 124 and level 122 is inversely quantized by the inverse quantizer 125, in parallel. Then, the results of inverse equalization are stored in the DCT coefficient block storage unit 128 in the following manner. The storage portion 128a determines a position to store the inverse quantization result 126 in the DCT storing portion 128b by the scanning order and the run 120 "0".

On the other hand, the storage portion 128a determines the position to store the inverse quantization result 127 in the DCT coefficient storing portion 128b by the scanning order and the run 123 "0". AS set forth above, in the shown unit, variable length decoding is performed for at most two code words by only one table lookup operation. Furthermore, for the levels obtained by decoding, inverse quantization is performed in parallel to achieve high speed DCT coefficient block decoding. In addition, by restricting the number of the codewords to be decoded simultaneously to be less than or equal to two the system can be constructed with the memory IC which has small capacity.

While the foregoing discussion has been given for the construction where seven kinds of the lookup tables are employed, t is clear that the signal decoding system according to the present invention can be constructed with more than or less than seven lookup tables. Besides, the seven lookup tables may be constructed in other ways. On the other hand, all components in the DCT coefficient block decoding system in FIG. 23 may be implemented as programs of microprocessor. In this case, the DCT coefficient block decoding processing system may be constructed as the case of FIGS. 20 to 22.

While the foregoing discussion has been given for decoding and inverse quantization of the image signal, the present invention is of course applicable for other type of signals.

As set forth above, according to the present invention, DCT coefficient block decoding can be speeded up by simultaneously performing variable length decoding for multiple codewords, performing inverse quantization in parallel and neglecting inverse quantization for zero coefficients. In addition, by using the lookup table having the less number of table elements, necessary memory amount can be reduced.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A signal decoding system comprising:
a decoder which performs a variable length decoding process simultaneously for multiple codewords of a variable length code; and
inverse quantization means for inversely quantizing in parallel the multiple decoded codewords received from said decoder,
wherein said decoder comprises a plurality of lookup tables showing correspondence between codeword data and decoded data, and table lookup means for selectively looking-up data in said lookup tables, and wherein at least one of said plurality of lookup tables provides decoded data for multiple codewords with only one lookup operation.

2. A signal decoding system as set forth in claim 1, wherein said inverse quantization means includes multiple inverse quantizers for performing inverse quantization for decoded data in parallel.

3. A signal decoding system as set forth in claim 1, wherein said at least one of said plurality of lookup tables provides decoded data for a maximum of two codewords with only one lookup operation.

4. A method of generating a lookup table to be used in a variable length decoding process comprising the steps of:
storing, in a table address, runs and levels corresponding to two concatenated codewords and their total concatenated length when the two concatenated codewords form a K bit prefix, wherein K is an integer greater than or equal to two and less than seventeen, and wherein said prefix is a representation of said table address;
storing, in said table address, a run and level corresponding to one codeword and the length of the one codeword, when the K bit prefix representation of the table address is formed by the one codeword and not by two concatenated codewords; and
otherwise storing a dummy data in said table address, wherein said method is performed for all table addresses in said lookup table.

5. A signal decoding method comprising the steps of:
simultaneously decoding multiple codewords of a variable length code; and
inversely quantizing in parallel the decoded multiple codewords,
wherein the decoding step is performed using a plurality of lookup tables showing correspondence between codeword data and decoded data, and wherein at least one of said plurality of lookup tables provides decoded data for multiple codewords with only one lookup operation.

6. A signal decoding method as set forth in claim 5, wherein said at least one of said plurality of lookup tables provides decoded data for a maximum of two codewords with only one lookup operation.

7. A signal decoding method comprising the steps of:
simultaneously decoding multiple codewords of a variable length code, wherein the decoding step is performed using a plurality of lookup tables showing correspondence between codeword data and decoded data;
inversely quantizing in parallel the decoded multiple codewords; and
generating each of said plurality of lookup tables, wherein said generating step comprises the substeps of:
storing, in a table address, runs and levels corresponding to two concatenated codewords and their total concatenated length when the two concatenated codewords from a K bit prefix, wherein K is an integer greater than or equal to two and less than seventeen, and wherein said prefix is a representation of said table address;
storing, in said table address, a run and level corresponding to one codeword and the length of the one codeword, when the K bit prefix representation of the table address is formed by the one codeword and not by two concatenated codewords; and
otherwise storing a dummy data in said table address, wherein said generating step is performed for all table addresses in said each lookup table.

8. A signal decoding system comprising:
a decoder which performs a variable length decoding process simultaneously for multiple codewords of a variable length code; and
inverse quantization means for inversely quantizing in parallel the multiple decoded codewords received from said decoder,
wherein said decoder comprises a plurality of lookup tables showing correspondence between codeword data and decoded data, and table lookup means for selectively looking-up data in said lookup tables, and wherein each of said plurality of lookup tables comprises a plurality of table addresses, each of said table addresses containing one of
a) runs and levels corresponding to two concatenated codewords and their total concatenated length, when the two concatenated codewords form a K bit prefix, wherein K is an integer greater than or equal or two and less than seventeen, and wherein said prefix is a representation of said table address;

b) a run and level corresponding to one codeword and the length of the one codeword, when the K bit prefix representation of the table address is formed by the one codeword and not by two concatenated codewords; or c) a dummy data.

9. A signal decoding system as set forth in claim 8, wherein said inverse quantization means includes multiple inverse quantizers for performing inverse quantization for decoded data in parallel.

* * * * *